(12) United States Patent
Robinson

(10) Patent No.: US 10,480,654 B2
(45) Date of Patent: *Nov. 19, 2019

(54) JOINT SEAL SYSTEM HAVING INTERNAL BARRIER AND EXTERNAL WINGS

(71) Applicant: Schul International Co., LLC, Hudson, NH (US)

(72) Inventor: Steven R. Robinson, Windham, NH (US)

(73) Assignee: Schul International Co., LLC, Hudson, NH (US)

( * ) Notice: Subject to any disclaimer, the term of this patent is extended or adjusted under 35 U.S.C. 154(b) by 203 days.

This patent is subject to a terminal disclaimer.

(21) Appl. No.: 15/435,756

(22) Filed: Feb. 17, 2017

(65) Prior Publication Data

US 2017/0159817 A1 Jun. 8, 2017

Related U.S. Application Data

(63) Continuation-in-part of application No. 15/189,671, filed on Jun. 22, 2016, now Pat. No. 10,203,035,
(Continued)

(51) Int. Cl.
*F16J 15/06* (2006.01)
*F16J 15/10* (2006.01)
(Continued)

(52) U.S. Cl.
CPC ............... *F16J 15/065* (2013.01); *B32B 3/02* (2013.01); *B32B 3/04* (2013.01); *B32B 3/30* (2013.01);
(Continued)

(58) Field of Classification Search
CPC .... F16J 15/065; B32B 25/045; B32B 15/046; B32B 5/18
See application file for complete search history.

(56) References Cited

U.S. PATENT DOCUMENTS

| 945,914 | A | 4/1909 | Colwell |
| 1,371,727 | A | 3/1921 | Blickle |

(Continued)

FOREIGN PATENT DOCUMENTS

| CA | 1280007 | 2/1991 |
| CA | 1334268 | 2/1995 |

(Continued)

OTHER PUBLICATIONS

UL, LLC; Online Certifications Directory; "System No. WW-D-1092, XHBN.WW-D-1092 Joint Systems"; Sep. 24, 2012; retrieved on Feb. 1, 2018 from http://database.ul.com/cgi-bin/XYV/template/LISEXT/1FRAME/showpage.html?name=XHBN.WW-D-1092&ccnshorttitle=Joint+Systems&objid=1082471646&cfgid=1073741824&version=versionless&parent_id=1073995560&sequence=1; 2 pages.

(Continued)

*Primary Examiner* — Hai Vo
(74) *Attorney, Agent, or Firm* — Crain, Caton & James, P.C.; James E. Hudson, III

(57) ABSTRACT

An integral multilayer joint seal. Layers of foam, layered co-planar to the adjacent surface, are interspersed with a barrier layer which extends beyond the foam layers to provide a protective surface, a surface for attachment atop adjacent substrates, or a connecting tab for use with adjacent joint seals. The foam layers may be uncompressed or partially compressed at the time of joint formation and may be composed of open or closed, or hybrid, cell foam. The foam may be impregnated with a fire retardant or may be composed of a fire retardant material, if desired. The barrier may have a tensile strength greater than the adjacent foam. The joint seal may have an elastomer, such as silicone, at its top and/or bottom, and may even include an elastomer layer within or about the barrier.

14 Claims, 12 Drawing Sheets

Related U.S. Application Data which is a continuation of application No. 14/630,125, filed on Feb. 24, 2015, now Pat. No. 9,404,581.

(60) Provisional application No. 61/946,311, filed on Feb. 28, 2014.

(51) Int. Cl.

| | | |
|---|---|---|
| *B32B 5/18* | (2006.01) | |
| *B32B 7/12* | (2006.01) | |
| *B32B 3/02* | (2006.01) | |
| *B32B 3/30* | (2006.01) | |
| *B32B 3/04* | (2006.01) | |
| *B32B 15/20* | (2006.01) | |
| *B32B 25/04* | (2006.01) | |
| *B32B 15/04* | (2006.01) | |

(52) U.S. Cl.
CPC .............. *B32B 5/18* (2013.01); *B32B 7/12* (2013.01); *B32B 15/046* (2013.01); *B32B 15/20* (2013.01); *B32B 25/045* (2013.01); *F16J 15/104* (2013.01); *B32B 2260/04* (2013.01); *B32B 2260/046* (2013.01); *B32B 2307/202* (2013.01); *B32B 2307/302* (2013.01); *B32B 2307/304* (2013.01); *B32B 2307/3065* (2013.01); *B32B 2307/7246* (2013.01); *B32B 2307/7265* (2013.01); *B32B 2419/00* (2013.01); *B32B 2581/00* (2013.01)

(56) References Cited

U.S. PATENT DOCUMENTS

| | | |
|---|---|---|
| 2,544,532 A | 3/1951 | Jill |
| 2,995,056 A | 10/1960 | Knox |
| 3,262,894 A | 7/1966 | Green |
| 3,334,557 A | 8/1967 | Fitzgibbon |
| 3,449,879 A | 6/1969 | Bloom |
| 3,455,850 A | 7/1969 | Saunders |
| 3,492,250 A | 1/1970 | Deyrup |
| 3,527,009 A | 9/1970 | Nyquist |
| 3,712,188 A | 1/1973 | Worson |
| 3,772,220 A | 11/1973 | Porter et al. |
| 3,827,204 A | 8/1974 | Walters |
| 3,883,475 A | 5/1975 | Racky et al. |
| 4,018,539 A | 4/1977 | Puccio |
| 4,058,947 A | 11/1977 | Earle et al. |
| 4,134,875 A | 1/1979 | Tapia |
| 4,181,711 A | 1/1980 | Ohashi et al. |
| 4,224,374 A | 9/1980 | Priest |
| 4,237,182 A | 12/1980 | Fulmer et al. |
| 4,260,688 A | 4/1981 | Simon |
| 4,288,559 A | 9/1981 | Illger |
| 4,374,207 A | 2/1983 | Stone et al. |
| 4,401,716 A | 8/1983 | Tschudin-Mahrer |
| 4,455,396 A | 6/1984 | Al-Tabacichall et al. |
| 4,565,550 A | 1/1986 | Dorer, Jr. et al. |
| 4,566,242 A | 1/1986 | Dunsworth |
| 4,654,550 A | 3/1987 | Lowther et al. |
| 4,767,655 A | 8/1988 | Tschudin-Mahrer |
| 4,839,223 A | 6/1989 | Tschudin-Mahrer |
| 4,922,676 A | 5/1990 | Sproken |
| 4,992,481 A | 2/1991 | von Bonin et al. |
| 5,000,813 A | 3/1991 | Hill |
| 5,006,564 A | 4/1991 | Noonenbruch et al. |
| 5,007,765 A | 4/1991 | Deitlein et al. |
| 5,130,176 A | 7/1992 | Baerveldt |
| 5,173,515 A | 12/1992 | von Bonin |
| 5,253,459 A | 10/1993 | Parinas et al. |
| 5,327,693 A | 7/1994 | Schmid |
| 5,335,466 A | 8/1994 | Langohr |
| 5,686,174 A | 7/1997 | Irrgeher |
| 5,744,199 A | 4/1998 | Joffre et al. |
| 5,765,332 A | 6/1998 | Landin et al. |
| 5,935,695 A | 8/1999 | Baerveldt |
| 6,039,503 A | 3/2000 | Cathey |
| 6,418,688 B1 | 7/2002 | Jones, Jr. |
| 6,532,708 B1 | 3/2003 | Baerveldt |
| 6,544,445 B1 | 4/2003 | Graf et al. |
| 6,666,618 B1 | 12/2003 | Anaya et al. |
| 6,685,196 B1 | 2/2004 | Baerveldt |
| 6,698,146 B2 | 3/2004 | Morgan et al. |
| 6,928,777 B2 | 8/2005 | Cordts |
| 8,317,444 B1 | 11/2012 | Hensley |
| 8,341,908 B1 | 1/2013 | Hensley et al. |
| 8,365,495 B1 | 2/2013 | Witherspoon |
| 8,590,231 B2 | 11/2013 | Pilz et al. |
| 8,595,999 B1 | 12/2013 | Pilz et al. |
| 8,720,138 B2 | 5/2014 | Hilburn, Jr. |
| 8,739,495 B1 | 6/2014 | Witherspoon |
| 8,813,449 B1 | 8/2014 | Hensley et al. |
| 8,813,450 B1 | 8/2014 | Hensley et al. |
| 8,870,506 B2 | 10/2014 | Hensley et al. |
| 8,935,897 B2 | 1/2015 | Shaw |
| 9,045,899 B2 | 6/2015 | Pilz et al. |
| 9,068,297 B2 | 6/2015 | Hensley et al. |
| 9,200,437 B1 | 12/2015 | Hensley et al. |
| 9,206,596 B1 | 12/2015 | Robinson |
| 9,322,163 B1 | 4/2016 | Hensley |
| 9,404,581 B1 | 8/2016 | Robinson |
| 9,528,262 B2 | 12/2016 | Witherspoon |
| 9,631,362 B2 | 4/2017 | Hensley et al. |
| 9,637,915 B1 | 5/2017 | Hensley et al. |
| 9,644,368 B1 | 5/2017 | Witherspoon |
| 9,670,666 B1 | 6/2017 | Witherspoon et al. |
| 9,677,299 B2 | 6/2017 | Whiteley |
| 9,689,157 B1 | 6/2017 | Hensley et al. |
| 9,689,158 B1 | 6/2017 | Hensley et al. |
| 9,719,248 B1 | 8/2017 | Meacham |
| 9,732,853 B2 | 8/2017 | Kethorn et al. |
| 9,739,049 B1 | 8/2017 | Robinson |
| 9,739,050 B1 | 8/2017 | Hensley et al. |
| 9,745,738 B2 | 8/2017 | Robinson |
| 9,765,486 B1 | 9/2017 | Robinson |
| 9,803,357 B1 | 10/2017 | Robinson |
| 9,840,814 B2 | 12/2017 | Robinson |
| 9,850,662 B2 | 12/2017 | Hensley |
| 9,856,641 B2 | 1/2018 | Robinson |
| 9,915,038 B2 | 3/2018 | Robinson |
| 9,951,515 B2 | 5/2018 | Robinson |
| 9,963,872 B2 | 5/2018 | Hensley et al. |
| 9,982,428 B2 | 5/2018 | Robinson |
| 9,982,429 B2 | 5/2018 | Robinson |
| 9,995,036 B1 | 6/2018 | Robinson |
| 10,000,921 B1 | 6/2018 | Robinson |
| 10,060,122 B2 | 8/2018 | Robinson |
| 10,066,386 B2 | 9/2018 | Robinson |
| 10,066,387 B2 | 9/2018 | Hensley et al. |
| 10,081,939 B1 | 9/2018 | Robinson |
| 10,087,619 B1 | 10/2018 | Robinson |
| 10,087,620 B1 | 10/2018 | Robinson |
| 10,087,621 B1 | 10/2018 | Robinson |
| 10,072,413 B2 | 11/2018 | Hensley et al. |
| 10,125,490 B2 | 11/2018 | Robinson |
| 10,179,993 B2 | 1/2019 | Hensley et al. |
| 10,203,035 B2 | 2/2019 | Robinson |
| 10,213,962 B2 | 2/2019 | Robinson |
| 10,227,734 B1 | 3/2019 | Robinson |
| 10,233,633 B2 | 3/2019 | Robinson |
| 10,240,302 B2 | 3/2019 | Robinson |
| 2003/0005657 A1 | 1/2003 | Visser et al. |
| 2003/0110723 A1 | 6/2003 | Baerveldt |
| 2004/0035075 A1 | 2/2004 | Trout |
| 2004/0093815 A1 | 5/2004 | Cordts |
| 2005/0034389 A1 | 2/2005 | Boot |
| 2005/0126848 A1 | 6/2005 | Siavoshai |
| 2006/0053710 A1 | 3/2006 | Miller et al. |
| 2006/0117692 A1 | 6/2006 | Trout |
| 2007/0059516 A1 | 3/2007 | Vincent et al. |
| 2008/0172967 A1 | 7/2008 | Hilburn |
| 2008/0268231 A1 | 10/2008 | Deib |
| 2010/0275539 A1 | 11/2010 | Shaw |
| 2010/0304078 A1 | 12/2010 | Stol |

(56) References Cited

U.S. PATENT DOCUMENTS

| | | |
|---|---|---|
| 2012/0022176 A1 | 1/2012 | Strahl et al. |
| 2012/0023846 A1 | 2/2012 | Mattox et al. |
| 2012/0117900 A1 | 5/2012 | Shaw |
| 2013/0055667 A1 | 3/2013 | Beele |
| 2014/0219719 A1 | 8/2014 | Hensley et al. |
| 2014/0360118 A1 | 12/2014 | Hensley et al. |
| 2015/0068139 A1 | 3/2015 | Witherspoon |
| 2015/0337530 A1 | 11/2015 | Pilz et al. |
| 2017/0130450 A1 | 5/2017 | Witherspoon |
| 2017/0159817 A1 | 6/2017 | Robinson |
| 2017/0191256 A1 | 7/2017 | Robinson |
| 2017/0226733 A1 | 8/2017 | Hensley et al. |
| 2017/0241132 A1 | 8/2017 | Witherspoon |
| 2017/0254027 A1 | 9/2017 | Robinson |
| 2017/0268222 A1 | 9/2017 | Witherspoon et al. |
| 2017/0292262 A1 | 10/2017 | Hensley et al. |
| 2017/0298618 A1 | 10/2017 | Hensley et al. |
| 2017/0314213 A1 | 11/2017 | Robinson |
| 2017/0314258 A1 | 11/2017 | Robinson |
| 2017/0342665 A1 | 11/2017 | Robinson |
| 2017/0342708 A1 | 11/2017 | Hensley et al. |
| 2017/0370094 A1 | 12/2017 | Robinson |
| 2018/0002868 A1 | 1/2018 | Robinson |
| 2018/0016784 A1 | 1/2018 | Hensley et al. |
| 2018/0038095 A1 | 2/2018 | Robinson |
| 2018/0106001 A1 | 4/2018 | Robinson |
| 2018/0106032 A1 | 4/2018 | Robinson |
| 2018/0119366 A1 | 5/2018 | Robinson |
| 2018/0142465 A1 | 5/2018 | Robinson |
| 2018/0148922 A1 | 5/2018 | Robinson |
| 2018/0163394 A1 | 6/2018 | Robinson |
| 2018/0171564 A1 | 6/2018 | Robinson |
| 2018/0171625 A1 | 6/2018 | Robinson |
| 2018/0202148 A1 | 7/2018 | Hensley et al. |
| 2018/0238048 A1 | 8/2018 | Robinson |
| 2018/0266103 A1 | 9/2018 | Robinson |
| 2018/0274228 A1 | 9/2018 | Robinson |
| 2018/0300490 A1 | 10/2018 | Robinson |
| 2018/0363292 A1 | 12/2018 | Robinson |
| 2018/0371746 A1 | 12/2018 | Hensley et al. |
| 2018/0371747 A1 | 12/2018 | Hensley et al. |
| 2019/0057215 A1 | 2/2019 | Robinson |
| 2019/0063608 A1 | 2/2019 | Robinson et al. |
| 2019/0071824 A1 | 3/2019 | Robinson |
| 2019/0107201 A1 | 4/2019 | Robinson |
| 2019/0108351 A1 | 4/2019 | Robinson |

FOREIGN PATENT DOCUMENTS

| | | |
|---|---|---|
| CA | 2296779 | 11/2006 |
| DE | 4426280 A1 | 2/1996 |
| DE | 102005054375 A1 | 5/2007 |
| EP | 0942107 A2 | 9/1999 |
| EP | 1118715 B1 | 10/2004 |
| EP | 1540220 | 3/2006 |
| EP | 1983119 A1 | 4/2007 |
| GB | 977929 | 12/1964 |
| GB | 1359734 | 7/1974 |
| GB | 1495721 | 12/1977 |
| GB | 1519795 | 8/1978 |
| GB | 2251623 A1 | 7/1992 |
| GB | 2359265 A1 | 8/2001 |
| WO | 03006109 | 1/2003 |
| WO | 2003066766 A1 | 8/2003 |
| WO | 2007023118 A2 | 3/2007 |
| WO | 2006127533 A1 | 11/2009 |

OTHER PUBLICATIONS

UL, LLC; Online Certifications Directory; "System No. WW-D-1093, XHBN.WW-D-1093 Joint Systems";Oct. 6, 2014; retrieved on Feb. 1, 2018 from http://database.ul.com/cgi-bin/XYV/template/LISEXT/1FRAME/showpage.html?name=XHBN.WW-D-1093&ccnshorttitle=Joint+Systems&objid=1082823956&cfgid=1073741824&version=versionless&parent_id=1073995560&sequence=1; 3 pages.

UL, LLC; Online Certifications Directory; "System No. HW-D-1098, XHBN.HW-D-1098 Joint Systems"; Jun. 6, 2013; retrieved on Feb. 1, 2018 from http://database.ul.com/cgi-bin/XYV/template/LISEXT/1FRAME/showpage.html?name=XHBN.HW-D-1098&ccnshorttitle=Joint+Systems&objid=1082700131&cfgid=1073741824&version=versionless&parent_id=1073995560&sequence=1; 3 pages.

UL, LLC; Online Certifications Directory; "System No. FF-D-1100, XHBN.FF-D-1100 Joint Systems"; Sep. 24, 2012; retrieved on Feb. 1, 2018 from http://database.ul.com/cgi-bin/XYV/template/LISEXT/1FRAME/showpage.html?name=XHBN.FF-D-1100&ccnshorttitle=Joint+Systems&objid=1082567162&cfgid=1073741824&version=versionless&parent_id=1073995560&sequence=1; 2 pages.

UL, LLC; Online Certifications Directory; "System No. WW-D-1101, XHBN.WW-D-1101 Joint Systems"; Oct. 6, 2014; retrieved on Feb. 1, 2018 from http://database.ul.com/cgi-bin/XYV/template/LISEXT/1FRAME/showpage.html?name=XHBN.WW-D-1101&ccnshorttitle=Joint+Systems&objid=1082823966&cfgid=1073741824&version=versionless&parent_id=1073995560&sequence=1; 2 pages.

UL, LLC; Online Certifications Directory; "System No. WW-D-1102, XHBN.WW-D-1102 Joint Systems"; Sep. 24, 2012; retrieved on Feb. 1, 2018 from http://database.ul.com/cgi-bin/XYV/template/LISEXT/1FRAME/showpage.html?name=XHBN.WW-D-1102&ccnshorttitle=Joint+Systems&objid=1082699876&cfgid=1073741824&version=versionless&parent_id=1073995560&sequence=1; 2 pages.

UL, LLC; Online Certifications Directory; "System No. FF-D-1109, XHBN.FF-D-1109 Joint Systems"; Jul. 29, 2013; retrieved on Feb. 1, 2018 from http://database.ul.com/cgi-bin/XYV/template/LISEXT/1FRAME/showpage.html?name=XHBN.FF-D-1109&ccnshorttitle=Joint+Systems&objid=1082845106&cfgid=1073741824&version=versionless&parent_id=1073995560&sequence=1; 2 pages.

UL, LLC; Online Certifications Directory; "System No. FF-D-1110, XHBN.FF-D-1110 Joint Systems"; Nov. 1, 2013; retrieved on Feb. 1, 2018 from http://database.ul.com/cgi-bin/XYV/template/LISEXT/1FRAME/showpage.html?name=XHBN.FF-D-1110&ccnshorttitle=Joint+Systems&objid=1082845102&cfgid=1073741824&version=versionless&parent_id=1073995560&sequence=1; 2 pages.

UL, LLC; Online Certifications Directory; "System No. WW-D-1119, XHBN.WW-D-1119 Joint Systems"; Jul. 29, 2013; retrieved on Feb. 1, 2018 from http://database.ul.com/cgi-bin/XYV/template/LISEXT/1FRAME/showpage.html?name=XHBN.WW-D-1119&ccnshorttitle=Joint+Systems&objid=1083149741&cfgid=1073741824&version=versionless&parent_id=1073995560&sequence=1; 3 pages.

UL, LLC; Online Certifications Directory; "System No. WW-D-1120, XHBN.WW-D-1120 Joint Systems"; Jun. 6, 2013; retrieved on Feb. 1, 2018 from http://database.ul.com/cgi-bin/XYV/template/LISEXT/1FRAME/showpage.html?name=XHBN.WW-D-1120&ccnshorttitle=Joint+Systems&objid=1083149707&cfgid=1073741824&version=versionless&parent_id=1073995560&sequence=1; 2 pages.

UL, LLC; Online Certifications Directory; "System No. FF-D-1148, XHBN.FF-D-1148 Joint Systems"; May 15, 2014; retrieved on Feb. 1, 2018 from http://database.ul.com/cgi-bin/XYV/template/LISEXT/1FRAME/showpage.html?name=XHBN.FF-D-1148&ccnshorttitle=Joint+Systems&objid=1084034211&cfgid=1073741824&version=versionless&parent_id=1073995560&sequence=1; 2 pages.

UL, LLC; Online Certifications Directory; "System No. WW-D-1152, XHBN.WW-D-1152 Joint Systems"; Aug. 14, 2014; retrieved on Feb. 1, 2018 from http://database.ul.com/cgi-bin/XYV/template/LISEXT/1FRAME/showpage.html?name=XHBN.WW-D-1152&ccnshorttitle=Joint+Systems&objid=1084034221&cfgid=1073741824&version=versionless&parent_id=1073995560&sequence=1; 2 pages.

UL, LLC; Online Certifications Directory; "System No. WW-D-1153, XHBN.WW-D-1153 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1153&ccnshorttitle=Joint+Systems&objid=1084052791&cfgid=1073741824&version=versionless&parent_id=1073995560&sequence=1; 2 pages.

UL, LLC; Online Certifications Directory; "System No. WW-D-1154, XHBN.WW-D-1154 Joint Systems"; Jun. 16, 2014; retrieved on Feb. 1, 2018 from http://database.ul.com/cgi-bin/XYV/template/LISEXT/1FRAME/showpage.html?name=XHBN.WW-D-1154

(56) References Cited

OTHER PUBLICATIONS

&ccnshorttitle=Joint+Systems&objid=1084052801&cfgid=1073741824&version=versionless&parent_id=1073995560&sequence=1; 2 pages.

UL, LLC; Online Certifications Directory; "System No. FF-D-1156, XHBN.FF-D-1156 Joint Systems"; Nov. 9, 2015; retrieved on Feb. 1, 2018 from http://database.ul.com/cgi-bin/XYV/template/LISEXT/1FRAME/showpage.html?name=XHBN.FF-D-1156&ccnshorttitle=Joint+Systems&objid=1085235671&cfgid=1073741824&version=versionless&parent_id=1073995560&sequence=1; 2 pages.

UL, LLC; Online Certifications Directory; "System No. FF-D-1157, XHBN.FF-D-1157 Joint Systems"; Nov. 9, 2015; retrieved on Feb. 1, 2018 from http://database.ul.com/cgi-bin/XYV/template/LISEXT/1FRAME/showpage.html?name=XHBN.FF-D-1157&ccnshorttitle=Joint+Systems&objid=1085235726&cfgid=1073741824&version=versionless&parent_id=1073995560&sequence=1; 2 pages.

Schul International; Firejoint 2FR-H & Firejoint 3FR-H; 2012; 2 pages.

Schul International; Firejoint 2FR-V & Firejoint 3FR-V; 2012; 2 pages.

UL, LLC; Online Certifications Directory; "System No. HW-D-1101, XHBN.HW-D-1101 Joint Systems"; Sep. 11, 2013; retrieved on Feb. 1, 2018 from http://database.ul.com/cgi-bin/XYV/template/LISEXT/1FRAME/showpage.html?name=XHBN.HW-D-1101&ccnshorttitle=Joint+Systems&objid=1083156306&cfgid=1073741824&version=versionless&parent_id=1073995560&sequence=1; 3 pages.

UL, LLC; Online Certifications Directory; "System No. FF-D-1121, XHBN.FF-D-1121 Joint Systems"; Apr. 25, 2013; retrieved on Feb. 1, 2018 from http://database.ul.com/cgi-bin/XYV/template/LISEXT/1FRAME/showpage.html?name=XHBN.FF-D-1121&ccnshorttitle=Joint+Systems&objid=1083156406&cfgid=1073741824&version=versionless&parent_id=1073995560&sequence=1; 2 pages.

UL, LLC; Online Certifications Directory; "System No. FF-D-1122, XHBN.FF-D-1122 Joint Systems"; Sep. 11, 2013; retrieved on Feb. 1, 2018 from http://database.ul.com/cgi-bin/XYV/template/LISEXT/1FRAME/showpage.html?name=XHBN.FF-D-1122&ccnshorttitle=Joint+Systems&objid=1083156361&cfgid=1073741824&version=versionless&parent_id=1073995560&sequence=1; 2 pages.

UL, LLC; Online Certifications Directory; "System No. FF-D-1123, XHBN.FF-D-1123 Joint Systems"; Sep. 11, 2013; retrieved on Feb. 1, 2018 from http://database.ul.com/cgi-bin/XYV/template/LISEXT/1FRAME/showpage.html?name=XHBN.FF-D-1123&ccnshorttitle=Joint+Systems&objid=1083156331&cfgid=1073741824&version=versionless&parent_id=1073995560&sequence=1; 2 pages.

UL, LLC; Online Certifications Directory; "System No. WW-D-1124, XHBN.WW-D-1124 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1124&ccnshorttitle=Joint+Systems&objid=1083156186&cfgid=1073741824&version=versionless&parent_id=1073995560&sequence=1; 2 pages.

UL, LLC; Online Certifications Directory; "System No. WW-D-1125, XHBN.WW-D-1125 Joint Systems"; Apr. 25, 2013; retrieved on Feb. 1, 2018 from http://database.ul.com/cgi-bin/XYV/template/LISEXT/1FRAME/showpage.html?name=XHBN.WW-D-1125&ccnshorttitle=Joint+Systems&objid=1083156176&cfgid=1073741824&version=versionless&parent_id=1073995560&sequence=1; 2 pages.

UL, LLC; Online Certifications Directory; "System No. WW-D-1126, XHBN.WW-D-1126 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1126&ccnshorttitle=Joint+Systems&objid=1083156461&cfgid=1073741824&version=versionless&parent_id=1073995560&sequence=1; 2 pages.

UL, LLC; Online Certifications Directory; "System No. WW-D-1127, XHBN.WW-D-1127 Joint Systems"; Sep. 11, 2013; retrieved on Feb. 1, 2018 from http://database.ul.com/cgi-bin/XYV/template/LISEXT/1FRAME/showpage.html?name=XHBN.WW-D-1127&ccnshorttitle=Joint+Systems&objid=1083156441&cfgid=1073741824&version=versionless&parent_id=1073995560&sequence=1; 3 pages.

UL, LLC; Online Certifications Directory; "System No. FF-D-1151, XHBN.FF-D-1151 Joint Systems"; Aug. 20, 2014; retrieved on Feb. 1, 2018 from http://database.ul.com/cgi-bin/XYV/template/LISEXT/1FRAME/showpage.html?name=XHBN.FF-D-1151&ccnshorttitle=Joint+Systems&objid=1084241891&cfgid=1073741824&version=versionless&parent_id=1073995560&sequence=1; 2 pages.

UL, LLC; Online Certifications Directory; "System No. WW-D-1160, XHBN.WW-D-1160 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1160&ccnshorttitle=Joint+Systems&objid=1084241902&cfgid=1073741824&version=versionless&parent_id=1073995560&sequence=1; 2 pages.

UL, LLC; Online Certifications Directory; "System No. WW-D-1161, XHBN.WW-D-1161 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1161&ccnshorttitle=Joint+Systems&objid=1084241911&cfgid=1073741824&version=versionless&parent_id=1073995560&sequence=1; 3 pages.

UL, LLC; Online Certifications Directory; "System No. WW-D-1162, XHBN.WW-D-1162 Joint Systems"; Aug. 20, 2014; retrieved on Feb. 1, 2018 from http://database.ul.com/cgi-bin/XYV/template/LISEXT/1FRAME/showpage.html?name=XHBN.WW-D-1162&ccnshorttitle=Joint+Systems&objid=1084241921&cfgid=1073741824&version=versionless&parent_id=1073995560&sequence=1; 2 pages.

UL, LLC; Online Certifications Directory; "System No. FF-D-1174, XHBN.FF-D-1174 Joint Systems"; Jul. 11, 2016; retrieved on Feb. 1, 2018 from http://database.ul.com/cgi-bin/XYV/template/LISEXT/1FRAME/showpage.html?name=XHBN.FF-D-1174&ccnshorttitle=Joint+Systems&objid=1085930212&cfgid=1073741824&version=versionless&parent_id=1073995560&sequence=1; 2 pages.

UL, LLC; Online Certifications Directory; "System No. FF-D-1175, XHBN.FF-D-1175 Joint Systems"; Jul. 12, 2016; retrieved on Feb. 1, 2018 from http://database.ul.com/cgi-bin/XYV/template/LISEXT/1FRAME/showpage.html?name=XHBN.FF-D-1175&ccnshorttitle=Joint+Systems&objid=1085930226&cfgid=1073741824&version=versionless&parent_id=1073995560&sequence=1; 2 pages.

Willseal, LLC; Willseal FR-2V; Mar. 4, 2013; 6 pages.

Willseal, LLC; Willseal FR-2H; Mar. 4, 2013; 6 pages.

Willseal, LLC; Willseal FR-V; dated 2013; 6 pages.

Willseal, LLC; Willseal FR-H; dated 2013; 6 pages.

Schul International Company, LLC; Firejoint 2FR-H & Firejoint 2FR-V; Aug. 2014; 3 pages.

Willseal, LLC; Willseal FR-2H & Willseal FR-2V; Mar. 4, 2013; 3 pages.

Willseal LLC; Willseal FR-H / Willseal FR-V; Oct. 2016; retrieved on Feb. 2, 2018 from https://willseal.com/wp-content/uploads/2016/10/WillsealFR_Install.pdf; 3 pages.

Schul International Company, LLC; Sealtite 50N; May 9, 2007; 2 pages.

Schul International Company, LLC; Seismic Sealtite; May 9, 2007; 2 pages.

Willseal LLC; MSDS for Willseal FR-V & FR-H; Jul. 19, 2013; 11 pages.

Schul International Company, LLC; Firejoint 2FR-V +50; dated 2012; 2 pages.

Stein et al. "Chlorinated Paraffins as Effective Low Cost Flame Retardants for Polyethylene" Dover Chemical Company Feb. 2003, 9 pages.

Hilti, Inc.; Firestop Board (CP 675T); 1 page; Apr. 2, 2007 (date shown in Google search: https://www.google.com/search?q=hilti+cp+675&source=Int&tbs=cdr%3A1%2Ccd_min%3A1%2F1%2F1900%2Ccd_max%3A12%2F31%2F2009&tbm).

Sandell Manufacturing Company, Inc.; Polyseal Precompressed Joint Sealant; 2 pages; Available by Jan. 31, 2000.

Hai Vo; Final Office Action for U.S. Appl. No. 15/189,671; dated May 31, 2018; 14 pages; USPTO; Alexandria, Virginia.

20H System Tech Data, Jun. 1997, 2 pages, Emseal Joint Systems, Ltd., USA.

Horizontal Colorseal Tech Data, Jun. 1997, 2 pages, Emseal Joint Systems, Ltd.

Emseal Acrylic Log Home Tape Installation Instructions, Jun. 2011, 1 page, Emseal Joint Systems, Ltd., retrieved on Mar. 30, 2016 from https://web.archive.org/web/20160330181621/http://www.emseal.com/Products-/Specialty/LogHome/AcrylicLogHome.sub.-Tapes.sub.--Install.sub.--X.pdf.

(56) References Cited

OTHER PUBLICATIONS

Emseal BEJS System—Bridge Expansion Joint System, May 26, 2010, 5 pages, Emseal Joint Systems, Ltd., retrieved on Mar. 30, 2016 from https://web.archive.org/web/20100526081854/http://www.emseal.com/products- /Infrastructure/BridgeJointSeals/BEJSBridgeJointSystem.htm.
Dow Corning 890-SL Self-Leveling Silicone Joint Sealant, 2005, 4 pages, USA.
Install Data—Horizontal Colorseal—with Epoxy Adhesive, Jun. 1997, 2 pages, Emseal Joint Systems, Ltd., USA.
Backerseal (Greyflex), Sep. 2001, 2 pages, Emseal Joint Systems, Ltd., USA.
Emseal Emshield DFR2 System DFR3 System Tech Data, May 2010, 4 pages, Emseal Joint Systems, Ltd., USA.
Seismic Colorseal by Emseal, Aug. 21, 2007, 4 pages, Emseal Corporation, USA.
Universal 90's, Aug. 4, 2009, 4 pages, Emseal Joint Systems, Ltd., USA.
Specified Technologies, Inc.; Product Data Sheet PEN200 Silicone Foam; 2003; 2 pages.
Specified Technologies, Inc.; Product Data Sheet SpecSeal Series ES Elastomeric Sealant; 2004; 4 pages.
Specified Technologies, Inc.; Product Data Sheet SpecSeal Series ES Elastomeric Sealant; 2000; 4 pages.
Specified Technologies, Inc.; Product Data Sheet PEN300 Silicone Foam; 2004; 4 pages.
Specified Technologies, Inc.; Firestop Submittal Package; 2000; 37 pages.
Hai Vo; Non-Final Office Action for U.S. Appl. No. 15/189,671; dated Mar. 7, 2018; 17 pages; USPTO; Alexandria, Virginia.
UFP Technologies; Polyethylene Foam Material; Dated Jan. 8, 2012; retrieved from https://web.archive.org/web/20120108003656/http://www.ufpt.com:80/materials/foam/polyethylene-foam.html on Mar. 7, 2018; 1 page.
Stephan, Beth A; Non-Final Office Action for U.S. Appl. No. 15/884,553; dated Mar. 7, 2018; 7 pages; USPTO; Alexandria, Virginia.
Harry Kim; International Preliminary Report on Patentability for PCT Application No. PCT/US17/17132; dated Feb 6, 2018; 6 pages; USPTO as IPEA; Alexandria, Virginia.
Adolf Wurth GmbH & Co. KG; 81 Elastic Joint Sealing Tape; retrieved Aug. 5, 2005; 4 pages.
Amber Composites; Expanding PU Foam Technical Data Sheet (Premier BG1); Feb. 1997; 2 pages.
ASTM International; ASTM E84-04; 2004; 19 pages.
ASTM International; Designation E 176-07 Standard Terminology of Fire Standards; 2007; 20 pages.
ASTM International; Standard Terminology of Fire Standards; Nov. 11, 2014; 20 pages.
Auburn Manufacturing Company; Auburn Product News—R-10400M; Dec. 2007; 1 page.
AWCI Construction Dimensions; Where's the Beef in Joint Sealants? Hybrids Hold the Key by Lester Hensley; Jan. 2006 3 pages.
British Board of Agrement; Compriband 600 Sealing Tapes—Certificate 96/3309; Jul. 14, 2005; 8 page.
British Board of Agrement; Compriband Super—Certificate 97/3331; Aug. 2, 2005; 4 pages.
British Board of Agrement; Illmod 600 Sealing Tapes; Mar. 26, 2003; 8 pages.
British Standards Institute; Translation—Nen 6069; Oct. 1991; 31 pages.
British Standards Institution; Fire tests on building materials and structures (BS476:Part 20); 1987; 44 pages.
Building and Engineering Standards Committee; Impregnated cellular plastics strips for sealing external joints—DIN 18542; Jan. 1999; 10 pages.
BuildingTalk; Choosing a sealant for building applications by Lester Hensley CEO and President of Emseal; May 21, 2007; 6 pages.

Centre for Fire Research; Determination of the Fire Resistance According to NEN 6069 of Joints in a Wall Sealed with Cocoband 6069 Impregnated Foam Strip; Nov. 1996; 19 pages.
DIN ev; Fire behavior of building materials and building components; Sep. 1977; 11 pages.
DIN ev; Fire behavior of building materials and building components; May 1998; 33 pages.
DIN ev; Fire behavior of building materials and elements; Mar. 1994; 144 pages.
Dow Corning; Dow Corning 790 Silicone Building Sealant; 1999; 8 pages.
Dow Corning; Dow Corning 790 Silicone Building Sealant; 2000; 6 pages.
Dow Corning; Dow Corning 790 Silicone Building Sealant; 2004; 4 pages.
Dow Corning; Dow Corning Firestop 400 Silicone Sealant; Jan. 15, 2001; 4 pages.
Dow Corning; Dow Corning Firestop 700 Silicone Sealant; Jan. 15, 2001; 6 pages.
Emseal Joint Systems Ltd.; Horizontal Colorseal Aug. 2000 2 pages.
Emseal Joint Systems Ltd.; Colorseal PC/SA Stick; 1 page; Jun. 7, 1995.
Emseal Joint Systems Ltd.; SJS-100-CHT-RN; 1 page; Nov. 20, 2007.
Emseal Joint Systems Ltd; 20H System Tech Data; Jun. 1997; 2 pages.
Emseal Joint Systems Ltd; Colorseal Aug. 2000 2 pages.
Emseal Joint Systems Ltd; DSH System; Nov. 2005; 2 pages.
Emseal Joint Systems Ltd; Fire-Rating of Emseal 20H System; Author of "LH"; Feb. 17, 1993/Apr. 18, 1993; 2 pages.
Emseal Joint Systems Ltd; Horizontal Colorseal Tech Data; Jun. 1997; 2 pages.
Emseal Joint Systems Ltd; Preformed Sealants and Expansion Joint Systems; May 2002, 4 pages.
Emseal Joint Systems Ltd; Preformed Sealants and Expansion Joints.; Jan. 2002; 4 pages.
Emseal Joint Systems Ltd; Seismic Colorseal; Apr. 1998; 2 pages.
Emseal Joint Systems; Seismic Colorseal; Aug. 2000; 2 pages.
Emseal; Benchmarks of Performance for High Movement Acrylic-Impregnated Precompressed Foam Sealants; Aug. 21, 2007; 7 pages.
Emseal; Seismic Colorseal-DS (Double Sided); Apr. 12, 2007; 4 pages.
Envirograf; Fire Kills; 2004; 8 pages available by at least Nov. 10, 2006 per Archive.org.
Fire Retardants Inc.; Fire Barrier CP 25WB + Caulk; 2002; 4 pages.
IBMB; Test 3002/2719—Blocostop F120; Mar. 24, 2000; 14 pages.
IBMB; Test 3263/5362—Firestop N; Jul. 18, 2002; 13 pages.
IBMB; Test 3568/2560; Sep. 30, 2005; 14 pages.
IFT Rosenheim; Evidence of Performance—Test Report 105 3246911e U R1; Apr. 19, 2006; 8 pages.
Illbruck Bau-Produkte GmbH u Co. KG; Willseal Firestop; Sep. 30, 1995; 2 pages.
Illbruck Inc.; Will-Seal 250 Spec Data; Aug. 1989; 2 pages.
Illbruck International; willseal the joint sealing tape; Jan. 1991; 19 pages.
Illbruck Sealant Systems inc..; Illbruck Willseal 600; Sep. 2001; 2 pages.
Illbruck USA; MSDS—Willseal 150/250 and/or EPS; Jul. 21, 1986; 2 pages.
Illbruck/USA; Will-Seal 150 Spec Data; Nov. 1987; 2 pages.
Iso Chemie GmbH; Iso-Bloco 600; 2 pages; Jul. 1, 2006.
Iso Chemie GmbH; Iso-Flame Kombi F120; Jul. 1, 2006; 2 pages.
IsoChemie; Technical Datasheet blocostop F-120; Jul. 26, 2002; 1 page.
Lester Hensley; Where's the Beef in Joint Sealants? Hybrids Hold the Key; Spring 2001; Applicator vol. 23 No. 2; 5 pages (alternative version available at http://www.emseal.com/InTheNews/2001HybridsConstructionCanada.pdf).
MM Systems; ejp Expansion Joints EIF; Nov. 16, 2007; 2 pages.
MM Systems; ejp Expansion Joints; Nov. 16, 2007; 2 pages.
MM Systems; MM ColorJoint/SIF Series; 3 pages; Jan. 14, 2007.

(56) References Cited

OTHER PUBLICATIONS

Norton Performance Plastics Corporation; Norseal V740FR; 1996; 2 pages.
PCT/US2005/036849 filed Oct. 4, 2005 by Emseal Corporation; 11 pages; published Mar. 1, 2007 by World Intellectual Property Organization as WO 2007/024246.
Promat; Promaseal FyreStrip Seals for Movement in Joints in Floors/Walls; Feb. 2006; 4 pages.
Promat; Promaseal Guide for linear gap seals and tire stopping systems; 20 pages; Jun. 2008.
Promat; Promaseal IBS Foam Strip Penetration Seals on Floors/Walls; Sep. 2004; 6 pages.
Promat; Promaseal IBS Safety Data Sheet; Jul. 25, 2007; 3 pages.
Salamander Industrial Products Inc.; Blocoband HF; Feb. 15, 1996; 1 page.
Schul International Co. LLC; Color Econoseal Technical Data; Nov. 18, 2005; 2 pages.
Schul International Co. LLC; Sealtite "B" Technical Data; Oct. 28, 2005; 2 pages.
Schul International Co. LLC; Sealtite Airstop AR; Apr. 2004; 1 page.
Schul International Co. LLC; Sealtite Airstop AR; Apr. 2007; 1 page.
Schul International Co. LLC; Sealtite Standard; May 9, 2007; 2 pages.
Schul International Co. LLC; Sealtite Technical Data; Oct. 28, 2005; 2 pages.
Schul International Co. LLC; Sealtite VP (600) Technical Data; 2002.
Schul International Co. LLC; Seismic Sealtite II Technical Data; Sep. 20, 2006; 2 pages.
Schul International Co. LLC; Seismic Sealtite Technical Data; Oct. 28, 2005; 2 pages.
Lee W. Young, Written Opinion of the International Searching Authority, PCT/US06/60096, dated Oct. 23, 2007, 4 pages, USPTO, USA.
Schul International Inc.; Sealtite 50N Technical Data; 2002; 2 pages.
Schul International Inc.; Sealtite 50N Technical Data; Oct. 28, 2005; 2 pages.
Emseal's new Universal-90 expansion joints, Buildingtalk, Mar. 27, 2009, 2 pages, Pro-Talk Ltd.
Schul International Inc.; Sealtite VP; Oct. 28, 2005; 2 pages.
Schul International Inc.; Sealtite; Jul. 25, 2008; 3 pages.
Sealant Waterproofing & Restoration Institute; Sealants: The Professionals' Guide p. 26; 1995; 3 pages.
Stein et al. "Chlorinated Paraffins as Effective Low Cost Flame Retardants for Polyethylene" Dover Chemical Company 9 pages.
Tremco illbruck B.V.; Cocoband 6069; Apr. 2007; 2 pages.
Tremco illbruck Limited; Alfacryl FR Intumescent Acrylic; Oct. 22, 2007; 2 pages.
Tremco illbruck Limited; Alfasil FR Oct. 22, 2007; 2 pages.
Tremco illbruck Limited; Compriband 600; Oct. 5, 2007; 2 pages.
Tremco illbruck Limited; Compriband Super FR; Dec. 4, 2007; 2 pages.
Tremco illbruck Limited; Technical Data Sheet Product Compriband Super FR; Oct. 18, 2004; 4 pages.
Tremco Illbruck Limited; Technical Data Sheet Product: Compriband Super; Sep. 29, 2004; 3 pages.
Tremco illbruck Limited; TechSpec Division Facade & Roofing Solutions; Mar. 2005; 10 pages.
Tremco illbruck; Alfas Bond; Apr. 13, 2007; 2 pages.
Tremco Illbruck; illmod 600; Jun. 2006; 2 pages.
Tremco illbruck; The Specification Product Range; Feb. 2007; 36 pages.
Tremco-illbruck Ltd.; Webbflex B1 PU Foam; Nov. 9, 2006; 2 pages.
Thomas Dunn, International Preliminary Report on Patentability—PCT/US06/60096, dated Oct. 21, 2008, 6 pages, USPTO, JSA.
Underwriter Laboratories Inc.; UL 2079 Tests for Fire Resistance of Building Joint Systems; Jun. 30, 2008; 38 pages.
Underwriter Laboratories LLC; System No. WW-S-0007 Joint Systems; Dec. 5, 1997 pages.
Underwriters Laboratories; Fire-resistance ratings ANSI/UL 263; 2014; 24 pages.
Underwriters Laboratories; UL 263 Fire Tests of Building Construction and Materials; Apr. 4, 2003; 40 pages.
Lee W. Young, International Search Report, PCT/US06/60096, dated Oct. 23, 2007, 2 pages, USPTO, USA.
BEJS System, Mar. 2009, 2 pages, Emseal Joint Systems, Ltd., USA.
Advanced Urethane Technologies; Polyurethane Foam Specification Sheet; 1 page; Apr. 1, 2007.
American Institute of Architects, Masterspec, Feb. 1997.
Bonsignore, P.V.; Alumina Trihydrate as a Flame Retardant for Polyurethane Foams; Journal of Cellular Plastics, 174 (4): 220-225; Jul./Aug. 1981; 6 pages.
Bonsignore, P.V.; Flame Retardant Flexible Polyurethane Foam by Post-Treatment with Alumina Trihydrate/latex Binder Dispersion Systems;Journal of Cellular Plastics; May-Jun. 1979, pp. 163-179, 17 pages.
Dow Corning USA; Letter of Oct. 4, 1984 to Emseal USA, Inc.; 1 page; Oct. 4, 1984.
Emseal Corporation; Emseal Emseal GreyFlex SpecData; 1984; 4 pages.
Emseal Joint System, Ltd.; 25V; Apr. 1996; 2 pages.
Emseal Joint Systems, Ltd.; Colorseal Tech Data; 2 pages; Feb. 1991.
Emseal Joint System, Ltd.; Colorseal TechData; Jan. 2000.
Emseal Joint Systems, Ltd.; Colorseal in EIFS Application Focus; May 1997; 2 pages.
Emseal Joint Systems, Ltd.; Greyflex Expanding Foam Sealant; Feb. 1992.
Emseal Joint Systems, Ltd.; Greyflex Tech Data; Apr. 1996.
Emseal Joint Systems, Ltd.; The Complete Package for All Joint Requirements; 6 pages; 1988.
Emseal Corporation; Research and Development at Emseal; Jun. 27, 2007; 2 pages.
Envirograf; Product 40: Intumescent-Coated Fireproof Sponge (Patented); Apr. 8, 2007, 2 pages.
Hilti Construction Chemicals, Inc.; CP 604 Flexible Firestop Sealant; 1 page; 2005.
Hilti Construction Chemicals, Inc.; CP 606 Flexible Firestop Sealant; 5 pages; Apr. 25, 2000.
Hilti, Inc.; Firestop Board (CP 675T); undated; 1 page.
Hilti Firestop Systems; Untitled; 3 pages; Aug. 2013.
Hilti, Inc; FS 657 Product Information, Material Safety Data Sheet, and UL Certificate of Compliance; 4 pages; Feb. 14, 2006.
Hilti Inc.; Material Data Safety Sheet FS 657 Fire Block; CP 658T Firestop Plug; 2 pages; Mar. 1, 2005.
Illbruck Construction Products; Worldwide solutions to joint-sealing and acoustic problems; Apr. 9, 1998; 77 pages.
Illbruck; Will-Seal Precompressed expanding foam sealants; Sep. 1988; 4 pages.
Illbruck Inc.; Willseal precompressed foam sealants; 1991; 4 pages.
Illbruck/USA; Will-Seal (binder); 39 pages; 1984.
Illbruck; Product Data Sheet Compriband MPA; Apr. 2000; 2 pages.
Illbruck Sealant Systems, inc.; Fax-Message of Jan. 30, 2002; Jan. 30, 2002; 14 pages.
Illbruck Sealant Systems, inc.; Fax-Message of Feb. 15, 2002; Feb. 15, 2002; 14 pages.
Iso-Chemie GmbH; Sicherheitsdatenblatt (ISO Flame Kombi F120); Jun. 30, 2004; 3 pages.
IsoChemie; Invoice 135652 to Schul International Co., LLC. for Iso-Bloco 600 and Iso-Flame Kombi F120; Apr. 26, 2007; 3 pages // IsoChemie; Order Confirmation 135652 to Schul International Co., LLC. For Iso-Bloco 600 and Iso-Flame Kombi F120; Apr. 26, 2007; 3 pages // IsoChemie; Correspondence of Jun. 8, 2006 and prior; 13 pages // Schul International Company; Invoice 18925 to P.J., Spillane; Sep. 14, 2007; 6 pages.
Katz, Harry S. and Milewski, John V.; Handbook of Fillers for Plastics; 1987; pp. 292-312.

(56) References Cited

OTHER PUBLICATIONS

Polytite Manufacturing Corp.; Spec Section 07920 Polytite Expansion Joint System; 1 page; May 1989.
Sandell Manufacturing Company, Inc.; About Polyseal—procompressed joint sealant—from Sandell Manufacturing; 2 pages; Mar. 15, 1999.
Sandell Manufacturing Company, Inc.; Polyseal Procompressed Joint Sealant; 2 pages; Undated.
Sandell Manufacturing Company, Inc.; Polytite Sealant & Construction Gasket; 1 page; 1978.
Schul International Co., LLC.; Seismic Sealtite "R"; 2 pages; 2002.
Soudal NV; Soudaband Acryl; Jun. 7, 2005; 4 pages.
Tremco Illbruck; Illbruck illmod Trio; Jun. 2007; 2 pages.
Tremco illbruck Produktion GmbH; Materials Safety Data Sheet (illmod 600); Mar. 2, 2007; 4 pages.
Westinghouse Savanah River Company; Design Proposal for Sealing Gap at Z-Area Saltstone Vault One, Cell A (U); 6 pages; Jul. 26, 1994; Aiken, South Carolina, available at http://pbadupws.nrc.gov/docs/ML0901/ML090120164.pdf, indexed by Google.
XHBN Joint Systems Data Sheet (retrieved Sep. 6, 2017 from http://database.ul.com/cgi-bin/XYV/template/LISEXT/1FRAME/showpage.html?name=XHBN.WW-D-0109&ccnshorttitle=Joint+Systems&objid=1082471571&cfgid=1073741824&version=versionless&parent_id=1073995560&sequence=1).
"Protecting the Foundation of Fire-safety" by Robert Berhinig, P.E. (IAEI News, Jul./Aug. 2002).
Stephan, Beth A; Non-Final Office Action for U.S. Appl. No. 15/681,500; dated Mar. 20, 2018; 7 pages; USPTO; Alexandria, Virginia.
Agudelo, Paola; Non-Final Office Action for U.S. Appl. No. 15/885,028; dated Mar. 30, 2018; 7 pages; USPTO; Alexandria, Virginia.
Hai Vo; Final Office Action for U.S. Appl. No. 14/630,125; dated May 13, 2016; 11 pages; USPTO; Alexandria, Virginia.
Hai Vo; Non-Final Office Action for U.S. Appl. No. 14/630,125; dated Feb. 8, 2016; 8 pages; USPTO; Alexandria, Virginia.
Hai Vo; Notice of Allowance for U.S. Appl. No. 14/630,125; dated Jun. 14, 2016; 12 pages; USPTO; Alexandria, Virginia.
Beth A. Stephan; Notice of Allowance for U.S. Appl. No. 14/643,031; dated Oct. 28, 2015; 8 pages; USPTO; Alexandria, Virginia.
Paola Agudelo; Final Office Action for U.S. Appl. No. 15/046,924; dated May 10, 2017; 13 pages; USPTO; Alexandria, Virginia.
Paola Agudelo; Non-Final Office Action for U.S. Appl. No. 15/046,924; dated Dec. 12, 2016; 12 pages; USPTO; Alexandria, Virginia.
Paola Agudelo; Notice of Allowance for U.S. Appl. No. 15/046,924; dated Jul. 6, 2017; 7 pages; USPTO; Alexandria, Virginia.
Gilbert Y. Lee; Notice of Allowance for U.S. Appl. No. 15/217,085; dated Sep. 13, 2017; 8 pages; USPTO; Alexandria, Virginia.
Paola Agudelo; Non-Final Office Action for U.S. Appl. No. 15/648,908; dated Oct. 4, 2017; 11 pages; USPTO; Alexandria, Virginia.
Paola Agudelo; Notice of Allowance for U.S. Appl. No. 15/648,908; dated Oct. 27, 2017; 8 pages; USPTO; Alexandria, Virginia.
Gilbert Y. Lee; Notice of Allowance for U.S. Appl. No. 15/649,927; dated Nov. 8, 2017; 7 pages; USPTO; Alexandria, Virginia.
Gilbert Y. Lee; Notice of Allowance for U.S. Appl. No. 15/677,811; dated Nov. 28, 2017; 7 pages; USPTO; Alexandria, Virginia.
Beth A. Stephan; Non-Final Office Action for U.S. Appl. No. 15/681,500; dated Jan. 5, 2018; 10 pages; USPTO; Alexandria, Virginia.
John Nguyen; International Preliminary Report on Patentability for PCT Application No. PCT/US16/19059; dated May 30, 2017; 6 pages; USPTO as IPEA; Alexandria, Virginia.
Shane Thomas; International Search Report and Written Opinion for PCT Application No. PCT/US16/19059; dated May 20, 2016; 7 pages; USPTO as ISA; Alexandria, Virginia.
Harry C. Kim; International Preliminary Report on Patentability for PCT Application No. PCT/US16/66495; dated Jan. 18, 2018; 8 pages; USPTO as IPEA; Alexandria, Virginia.
Shane Thomas; International Search Report and Written Opinion for PCT Application No. PCT/US16/66495; dated Feb. 27, 2017; 7 pages; USPTO as ISA; Alexandria, Virginia.
Shane Thomas; International Search Report and Written Opinion for PCT Application No. PCT/US17/17132; dated May 4, 2017; 6 pages; USPTO as ISA; Alexandria, Virginia.

JOINT SEAL SYSTEM HAVING INTERNAL BARRIER AND EXTERNAL WINGS

CROSS-REFERENCE TO RELATED APPLICATIONS

This application is a continuation of U.S. patent application Ser. No. 14/630,125, Joint seal system, filed Feb. 24, 2015 and issued Feb. 12, 2019 as U.S. Pat. No. 10,203,035, which is incorporated herein by reference, and claims the priority and benefit of U.S. Provisional Patent 61/946,311, filed Feb. 28, 2014 for "Joint Seal System," which is incorporated herein by reference.

STATEMENT REGARDING FEDERALLY SPONSORED RESEARCH OR DEVELOPMENT

BACKGROUND

Field

The present disclosure relates generally to systems for creating a durable seal between adjacent panels, including those which may be subject to temperature expansion and contraction or mechanical shear. More particularly, the present disclosure is directed to providing an integral multilayer joint seal system against one or more of water, fire, sound, air, smell, radiation, resistant and/or heat.

Description of the Related Art

Construction panels come in many different sizes and shapes and may be used for various purposes, including roadways, sideways, and pre-cast structures, particularly buildings. Use of precast concrete panels for interior and exterior walls, ceilings and floors, for example, has become more prevalent. As precast panels are often aligned in generally abutting relationship, forming a lateral gap or joint between adjacent panels to allow for independent movement, such in response to ambient temperature variations within standard operating ranges, building settling or shrinkage and seismic activity. Moreover, these joints are subject to damage over time. Most damage is from vandalism, wear, and environmental factors, where the seal may become thick and inflexible or are fragile. As a result, "long lasting" in the industry refers to a joint likely to be usable for a period greater than the typical lifespan of five (5) years. Various seals have been created in the field.

Various seal systems and configurations have been developed for imposition between these panels to provide seals which provide one or more of fire protection, waterproofing, and air insulation. This typically is accomplished with a seal created by imposition of multiple constituents in the joint, such as silicone application, backer bars, and compressible foams. Alternative prior art systems have included extruded glands and metallized bellows.

These systems, however, often fail due to the differences in compression and expansion of the various constituents, or the lack of bonding between layers, or because the system is directed to a particular purpose, such as water-resistance, but is exposed to fire, causing the seal system to fail and permit water to migrate behind the seal system. Vandalism, normal wear, and environmental exposure can change or defeat the properties of the exposed surface coating or membrane. There is also the case where the best material or barrier may not be used because it is aesthetically unpleasing or cannot easily be colored. By moving the membrane feature to an internal level sufficient to protect it and allow for the best properties of the joint sealant, these limitations can be overcome and the useful lifespan extended.

Additionally, in some cases the movement of the joint may be limited, sometimes to only twenty-five percent (+/−25%) in compression and expansion, for a total movement of only fifty percent (50%). These systems often use closed-cell, rather than open-cell, polyurethane foams. The need exists for a seismic joint having at least about fifty percent (50%) movement in each direction, for a movement total of about one hundred percent (100%) or more.

It would be an improvement to the art to provide a joint seal system which would include a plurality of compressible layers joined into a single unit prior to imposition and which would include a membrane barrier positioned intermediate two compressible layers. It would be a further improvement to provide the various compressible layers with differing functional properties, such as, for example, waterproofing and/or fire retardancy and durability associated with fire ratings.

Additionally, for pre-compressed joint sealants with a silicone face, a myriad of potential failure risks exists. Typically, the surface coating of these joints is relatively thin and can be damaged. Where joint substrate is irregular, a complete seal at the joint face might not be accomplished. Water intrusion from behind the joint face could find its way into or past the joint sealant and may result in poor performance or a leak, particularly problematic is products that rely on water-based intumescent surface coating, which can revert or delaminate if subject to continuous moisture. Pre-compressed or compressible joint sealants without an elastomer coating or surface impregnation often have similar limitations.

It would therefore be are improvement to safeguard the critical functions, by way of membrane barrier or the membrane barrier separating different operations of the foam, away from the surface where they can be damaged or bypassed. Thus, the joint seal surface will serve its primary aesthetic function of filling the joint with a matching or pleasing color without having the primary purpose of the system (water, fire etc.) subject to failure from superficial damage.

Additionally, foam sealants can take a compression set at some point. If the foam sealant systems designed based on laminations (acrylics or strong pressure sensitive adhesives in particular) are parallel to the joint substrate, they tend to separate over time, losing their sealant properties. The norm for these pressure sensitive adhesives impregnated systems is to use multiple, parallel laminations that are held together by their own adhesive force. These types of systems rely heavily on the elastomer surface coating for sealing and intumescent surface coatings for fire resistance. If there is any damage to the thin (60 mil or less coating) the system will not perform as designed. This is further complicated by the use of the multiple laminations that if separated would let water, smoke or fire penetrate system. Failure of any of these listed shortcomings will reduce the useful lifespan of the joint sealant.

Because the primary sealant is always subject to adhesive, cohesive, and environmental forces and therefore tends to wear out over time and leak, it is a good practice to have redundant systems.

Therefore, it would be an improvement to provide a joint seal with its own redundancy, particularly with regard to compression of foam seals.

Finally, it would be an improvement to provide a joint seal having a laminated or profiled lamination structure that could benefit from the push pull function of the joint.

SUMMARY

The present disclosure therefore meets the above needs and overcomes one or more deficiencies in the prior art by providing a joint seal system which provides a plurality of compressible layers, which may have different functional properties, joined into a single unit prior to imposition and which includes a barrier intermediate the plurality of compressible layers.

The joint seal therefore includes a first body of compressible foam, a second body of compressible foam, and a barrier adhered to both the first body of compressible foam and the second body of compressible foam, wherein all three components preferably have equivalent lengths and are aligned to provide common ends.

The joint seal is constructed by providing a first body of compressible foam, providing a second body of compressible foam, providing a barrier, adhering the barrier to the first body of compressible foam at the first body bottom, and cutting the first body of compressible foam, the second body of compressible foam, and the barrier to provide a common first end, and a common second end.

In an alternative embodiment, the joint seal includes a first body of compressible foam, a second body of compressible foam, and a barrier adhered to both the first body of compressible foam and the second body of compressible foam, wherein the foam bodies have equivalent lengths and widths but the barrier extends beyond the edge of the first body of compressible foam on at least one side, which may be turned up or down and adhered to the foam or the substrate, or which may be driven into adjacent joint systems or may be overlaid adjacent substrates before being covered with substrate materials or other covering.

The present invention thus provides redundancy, and potentially a status notification of change in critical joint conditions in situ for water-resistant, fire-resistant and/or roof expansion joints.

Additional aspects, advantages, and embodiments of the disclosure become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

Figure 1:
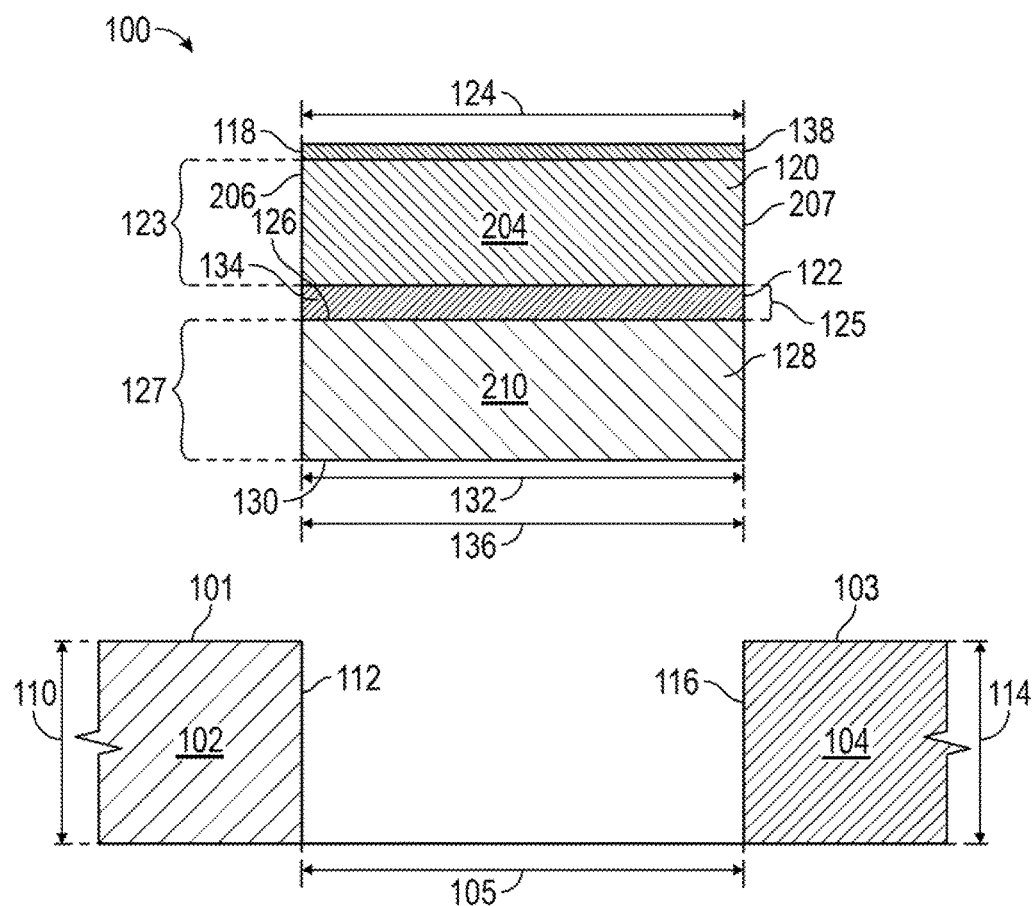
FIG. 1 is an illustration of an end view of the expansion joint seal system of the present disclosure.
Figure 2:
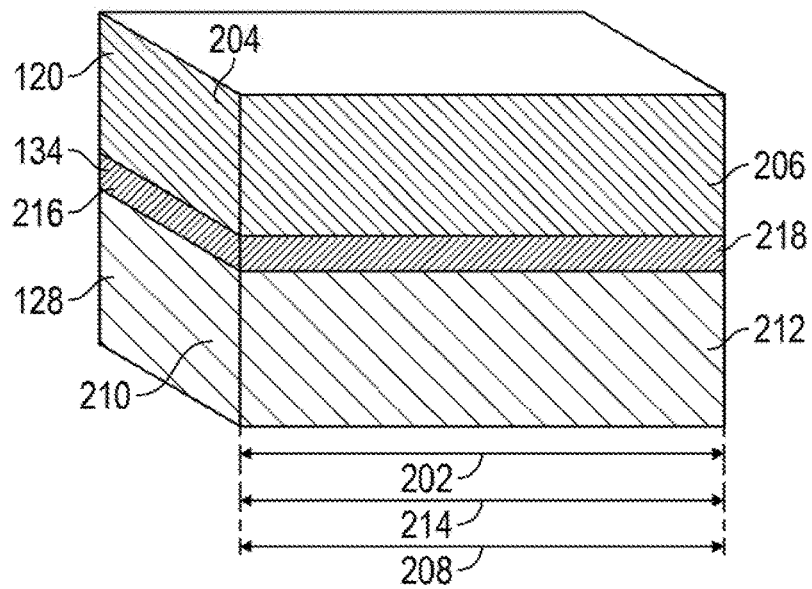
FIG. 2 is an illustration of a view of the expansion joint seal system of the present disclosure.

Referring to FIGS. 1 and 2, a joint seal 100 is provided for imposition under compression between a first substrate 102 and a second substrate 104 separated by a distance 105. The joint seal 100 includes a first lateral body of compressible foam 120, a second lateral body of compressible foam, and a lateral barrier 134, which are joined together to form an integral unit prior to the imposition under compression between the first substrate 102 and the second substrate 104. The formation of the joint seal 100 as an integral unit prevents the failure typically seal at such joints where a component of the joint system has separated from the joint and partly, or entirely, migrated out of the joint between the two substrates. The joint seal 100 of the present disclosure thus allows for sealing between substrates, such as roof joint substrates, at depths greater than typical, such as up to 6 inches deep, which may allow for functional features and addresses a known point of failure. Beneficially, the present disclosure allows for use of the joint seal 100 on roof-top patios or plazas as the joint seal 100 does not use a convex bellows design, but instead may rest nearly flush with the roof line. As can be appreciated, in such situations, and otherwise, the joint seal 100 may be provided in a variety of colors known in the art, including typical black and white, but also including colors which match the surrounding, such as green. To facilitate this purpose, the foam may be open or closed cell, or may be elected from any other material have similar compressibility and durability.

Consistent with this purpose, the first body of compressible foam 120 is sized for use in the joint seal system, specifically to extend laterally from a first substrate 102 to a second substrate 104, and therefore has a first body top 118, a first body bottom 122, a first body length 202, a first body first end 204, a first body width 124, a first body first side 206, and a first body second side 207. The first body of compressible foam 120 may be an open-celled foam, a closed-celled foam, or a hybrid foam. Depending on the selection of foam, the first body of compressible foam 120 may therefore have a predetermined water resistance. The first body of compressible foam 120 may be impregnated with a fire retardant, such as in a liquid medium, if at all, or may be composed of a fire-retardant material, if desired, and thereby have some degree of fire retardancy. The first body of compressible foam 120 may therefore be a fire retardant closed cell foam. Thus the first body of compressible foam 120 has a first body fire retardancy. The first body width 124 is sized to the distance 105 between the first substrate 102 and the second substrate 104 so as to contact the first substrate 102 at the body first side 206.

Similarly, the second body of compressible foam 128 is sized for formation of an integral unit with the first body of compressible foam 120 and to extend laterally from a first substrate 102 to a second substrate 104. The second body of compressible foam therefore has a second body top 126, a second body bottom 130, and a second body length 208, a second body first end 210, a second body width 132, and a second body first side 212. The second body of compressible foam 128 may be an open-celled foam, a closed-celled foam, or a hybrid foam. Depending on the selection of foam, the second body of compressible foam 128 may therefore have a predetermined water resistance, which may be greater than, equal to or less than the water resistance of the first body of compressible foam 120. The second body of compressible foam 128 may be impregnated with a fire retardant, if at all, or may be composed of a fire-retardant material, if desired, and thereby have some degree of fire retardancy. The second body of compressible foam 128 may therefore be a fire retardant closed cell foam. Similarly, the second body of compressible foam 128 has a second body fire retardancy, which may be equal to, less than, or greater than the first body fire retardancy.

The second body width 132 is sized, under the desired compression, to the distance 105 between the first substrate 102 and the second substrate 104.

While the first body of compressible foam 120 has a first body fire rating, and the second body of compressible foam 128 has a second body fire rating, the first body fire rating need not be the same as the second body fire rating. Moreover, while this first body of compressible foam 120 provides a primary sealant layer, it can be altered as a result of any water which permeates into it, as this changes is properties, thus fire-rating properties may differ in case of water penetration, a circumstance which must be accounted for in any testing regime. Fortunately, because the second body of compressible foam 128 is protected from water penetration by the barrier 134, the functional properties, such as the fire-rating properties, of the second body of compressible foam 128 are not compromised. Similarly, the second body of compressible foam 128 may be protected from deleterious materials, such as flowing chemicals, by the barrier 134. A body's fire rating may include the temperature at which the body burns, or flame spreads, or, in conjunction with or as an alternative thereto, the time-duration at which a body passes any one of several test standards known in the art. In one embodiment, the first body fire rating is unequal to the second body fire rating. Selection of the fire rating for the various layers of the joint seal 100 may be made to address operational issues, such as a high fire rating for the first layer or body 120, which will be directly exposed to fire, but which may provide limited waterproofing, coupled with a second body of compressible foam 128 which may have a lower fire rating, but a higher waterproofing rating, to address the potential loss of the first body of compressible foam 120 in a fire. The first body of compressible foam 120 may be fire resistant but may ablate in response to exposure, shedding size or volume when exposed to high temperature or fire with the membrane separating it from other layers, which may retain their structural integrity or otherwise continue to provide some sealing function and providing functional properties during exposure. The selection of foam, fire retardant impregnation, thickness and compression after imposition may provide sufficient resilience to repeated compression to pass at least one of the cycling regimes for various fire rating regimes, such as Underwriters Laboratories 2079, and may likewise provide sufficient fire retardancy to rate at least a one-hour rating, but preferably more, based on the Cellulosic time/temperature curve, such as UL 2079, ISO 834, BS 476: part 20, DIN 4102, etc. The Cellulosic time-temperature curve is described by the known equation $T=20+345*LOG(8*t\pm1)$ where t is time, in minutes, and T is temperature in degrees Celsius.

Detection of a compromised primary seal, the first body of compressible foam 120, may be addressed by the inclusion in the joint seal of radio frequency identification devices (RFIDs), which are known in the art, and which may provide identification of circumstances such as moisture penetration and accumulation. The inclusion of an RFID in the joint seal 100 may be particularly advantageous in circumstances where the joint seal 100 is concealed after installation, particularly as moisture sources and penetration may not be visually detected. Thus, by including a low cost, moisture-activated or sensitive RFID above or atop the barrier 134, the user can scan the joint seal 100 for any points of weakness due to water penetration. The barrier 134 may include a heat sensitive RFID, thus permitting identification of actual internal temperature, or identification of temperature conditions requiring attention, such as increased temperature due to the presence of fire, external to the joint or even behind it, such as within a wall. Such data may be particularly beneficial in roof and below grade installations where water penetration is to be detected as soon as possible.

Inclusion of RFIDs may provide substantial benefit for information feedback and potentially activating alarms or other functions within the joint sealant or external system. Fires that start in curtain walls are catastrophic. High and low pressure changes have deleterious effects on the long-term structure and the connecting features. Providing real time feedback from sensors, particularly given the inexpensive cost of such sensors, in those areas and particularly where the wind, rain and pressure will have their greatest impact would provide benefit. While the pressure on the wall is difficult to measure, for example, the deflection in a pre-compressed sealant is quite rapid and linear. Additionally, joint seals are used in interior structures including but not limited to bio-safety and cleanrooms. When used, the temperature sensing function of the barrier 134 may be extended by use of a heat-conductive material in or on the barrier 134, such that the barrier 134 is heat conductive, in communication with the RFID. Additionally, an RFID may be in connection or communication with an electrically-conductive barrier 134, such that a break in the barrier 134 may be immediately detected as a result of a change in conductivity. This may be accomplished by a copper membrane, a scrim, or mesh. A Faraday cage or shield may therefore also be used to limit electrical interference. Additionally, an RFID could be selected which would provide details pertinent to the state of the Leadership in Energy and Environmental Design (LEED) efficiency of the building. Additionally, such an RFID, which could identify and transmit air pressure differential data, could be used in connection with masonry wall designs that have cavity walls or in the curtain wall application, where the air pressure differential inside the cavity wall or behind the cavity wall is critical to maintaining the function of the system. RFIDs may be positioned in other locations within the joint seal 100 to provide beneficial data. An RFID may be positioned within first body of compressible foam 120 at or near the first body top 118 to provide prompt notice of detection of heat outside typical operating parameters, so as to indicate potential fire or safety issues. Such a positioning would be advantageous in horizontal of confined areas. An RFID positioned within first body of compressible foam 120 at or near the first body top 118 might alternatively be selected to provide moisture penetration data, beneficial in cases of failure or conditions beyond design parameters. The RFID may provide data on moisture content, heat or temperature, moisture penetration, and manufacturing details, and may be in contact with the first body of compressible foam 120, the second body of compressible foam 128, the third body of compressible foam 302, and/or the second resilient flexible barrier 304. In such cases, the RFID provides notice of exposure from the surface of the joint seal 100 most distant from the base of the joint. Alternatively, or in addition, an RFID can be positioned at or near the second body bottom 130 of the second body of compressible foam 128 to provide the same data (fire or water penetration) from the side most distant to the surface sealed. Further, RFIDs could be positioned at or near each end 204 of the first body of compressible foam 120 and/or the second body of compressible foam 128 so as to communicate relative position to the RFID positioned in the adjacent joint seal 100, such as where butt ends are spliced together, so as to identify any separation, or misalignment, of adjacent joint seals 100. Similarly, an RFID may be selected which provides notice of RF loss.

RFIDs may further provide real time data. Using moisture sensitive RFID's in the joint seal 100 and at critical junctions/connection would allow for active feedback on the waterproofing performance of the seal 100. It can also allow for routine verification of the watertightness of a roof joint with a hand-held RFID reader to find leaks before the reach occupied space and to find the source of a sting leak. Often water appears in a location much different than it originates making it difficult to isolate the area causing the leak. A positive reading from the RFID alerts the property owner to the enact location(s) that have water penetration without or before destructive means of finding the source. The use of an RFID in the joint seal 100 is not limited to identifying water intrusion but also fire, heat loss, air loss, break in joint continuity and other functions that cannot be checked by non-destructive means.

Use of an RFID within the body may provide a benefit over the prior art. Impregnated foam materials, such as the first body of compressible foam 120 and/or the second body of compressible foam 128, are known to cure fastest at exposed surfaces, encapsulating moisture remaining inside the body, and creating difficulties in permitting the removal of moisture from within the body. While heating is a known method to addressing these differences in the natural rate of cooling, it unfortunately may cause degradation of the foam in response. Similarly, while forcing air through the foam bodies may be used to address the curing issues, the potential random cell size and structure impedes airflow and impedes predictable results. Addressing the variation in curing is desirable as variations affect quality and performance properties. The use of an RFID within the body may permit use of the heating method while minimizing negative effects. A heat-sensing RFID sensor may be positioned near the surface (within 10% of the surface) of the first body of compressible foam 120 and/or the second body of compressible foam 128 and a moisture sensitive RFID may be positioned in the central ⅓ of the first body of compressible foam 120 and/or the second body of compressible foam 128. The data from the RFIDs, such as real time feedback from the heat, moisture and air pressure RFID, aids in production of a consistent product. Moisture and heat sensitive RFIDs aid in determining and/or maintaining optimal impregnation densities, airflow properties of the foam during the curing cycle of the foam impregnation. Placement of the RFID's into foam at the pre-determined different levels allows for optimum curing allowing for real time changes to temperature, speed and airflow resulting in increase production rates, product quality and traceability of the input variables to that are used to accommodate environmental and raw material changes for each product lots.

With the first body of compressible foam 120 and the second body of compressible foam 128, the joint seal 100 includes a barrier 134, positioned intermediate the first body of compressible foam 120 and the second body of compressible foam 128 so as to be laterally aligned with each and to extend laterally from at or near a first substrate 102 to at or near a second substrate 104. So as to be sized with the first body of compressible foam 120 and the second body of compressible foam 128, the barrier 134 has a barrier length 214, a barrier width 136 a barrier first end 216, and a barrier first side 218. The relative thickness 123, 127, 125 of each body 120, 128 and of a barrier 134 is dependent on the compositions selected for each layer or body 120, 128, the overall thickness of the joint seal 100, and the operating width of the joint seal 100. In the preferred embodiment, the thickness 123, 127 of the first body 120 and the second body 128 do not vary by more than fifty percent (50%) from one another, and no barrier is less than twenty-five percent (25%) of the thickness 123, 127 of the thinnest body 120, 128. The barrier 134 may facilitate installation of the joint seal 100, and may provide a temporary or permanent bond to the adjacent substrate. Moreover, after installation, the barrier 134 may allow for independent operation. The barrier 134 is adhered or otherwise bonded to the first body of compressible foam 120 and the second body of compressible foam 128, which may be accomplished by adhesives or chemical bonding, gluing or melting, or other methods known in the art to cause the barrier 134 to retain contact with one or both of the first body of compressible foam 120 and the second body of compressible foam 128 in response to movement. Thus, adhered is not limited solely to the use of adhesives but may include other methods known in the art. The barrier 134 may be liquid applied, may be a pre-cured system, or a fabricated element.

The thickness 127 of the second body of compressible foam 128 may be twice the thickness 123 of the first body of compressible foam 120, which has the benefit of moving the barrier 134 closer to the surface where the barrier 134 can better transfer loads, particularly when wider than the first body of compressible foam 120.

The barrier 134 may include a layer of a heat barrier, an infrared barrier, a high tensile barrier, a water barrier, air barrier and/or or a vapor barrier. The barrier 134 may include an intumescent material or have an intumescent material located on one or both sides of the barrier 134. In applications requiring the barrier 134 to be a redundant seal the intumescent is preferably placed opposite the anticipated exposure. It one or both of the first body of compressible foam 120 and second body of compressible foam 128 is not fire resistant, the intumescent provides a protective fire resistant layer. Similarly, if one or both of the first body of compressible foam 120 and second body of compressible foam 128 is fire resistant, the intumescent would offer additional fire resistance. Incorporating an internal fire resistance into the barrier 134 can increase the fire endurance of the joint seal 100, in some cases to greater than 4 hours without increasing the depth of foam required. In cases of wider pre-compressed foam-based expansion joints, the barrier 134 may be formed of a heavy-duty membrane, having an increased thickness and durability to provide beneficial support for such wider joints, particularly horizontal joints up to twelve inches (12") in width. The barrier 134 may be selected based on performance characteristics needed. Examples include materials such as hylene propylene diene monomer rubber, nitrile polyvinyl chloride, polyvinyl chloride, thermoplastic vulcanizate, styrene-butadiene-styrene modified bitumen, atactic polypropylene modified bitumen, built-up roof membranes, which integrate well with common roofing systems, which may include membrane or liquid applications, such as asphalt, thermoplastic vulcanizate, polyvinyl chloride, thermal plastic olefin modified bitumen, adhering systems, mechanically attached systems. The membrane 134 may be also be selected for self-function or performance and may be, for example, heat insulating, heat infrared reflective, or non-combustible.

The joint seal 100 provides improved durability to a known problem in the art regarding wide joints, particularly traffic joints, which must sustain pedestrian and vehicular traffic and the highly-concentrated forces associated with such traffic, such as, for example, small or narrow heels. A barrier 134 having a thickness of at least 0.03 inches (30 mil) better supports transfer loads such as cart wheels and foot traffic and provides durability comparable to use of a cover plate or assembly of spline and cover plate. The profile cut illustrated in FIG. 6, for example, is particularly beneficial in electromagnetic field (EMF) applications. Typically, in such situations, the type of copper foil associated with the EMF shielding fatigues and fails after a small number of cycles if required to randomly self "accordion" or flex within the foam. A barrier 134 of copper foil having a thickness of at least 0.1875 inches or a copper scrim ten (10) inches by ten (10) inches provides cycling durability equivalent to that experienced over five years of thermal cycling.

The membrane barrier 134 provides a further benefit in secondary containment applications where the joint is unattended for long period but must perform in an emergency. If the exposed surface is damaged or worn out it will fail. As the internal sealing membrane, barrier 134 will be protected and will function. The barrier 134 is sufficient to preclude penetration under intended operating conditions, such that a barrier for a one-hour rated fire-resistant expansion joint provides a sufficient barrier to ensure, together with the other components, including the various bodies and any other barriers, that the joint seal passes the applicable test used to determine the fire-rating. The joint seal 100 further provides a seal potentially capable of sustaining hydrostatic pressure, unlike the prior art. Typically, the density of the bodies of compressible foam reaches and ultimately limit where it no longer performs as a movement joint. In the prior art, a gland by itself is not sufficient to provide the function as a fail-safe secondary containment joint seal but it has been found that by combining it with foam core seal lamination that head pressures greater that 25' can be achieved. The high density of the first body 120 and the second body 128 required to function as an expansion joint in a high head pressure application is however greater than can be achieved while allowing for the material to act as a movement joint. The joint seal 100 overcomes this shortcoming by using as the barrier 134 a high-density membrane in a pattern such that it can facilitate compression yet provide the expansion and movement properties required for the joint seal 100. Because of the barrier 134, and even more beneficial with a connection to the substrate, the density of the first body 120 or the second body 128 can be maximized for support without reaching a density that limits the function as a movement joint. Integrated horizontal to vertical factory manufactured transitions using the same design are not required but allow for a faster transition and connection in critical sealing application.

Split-slab and deck applications can be configured such that the barrier 134 extends through metal side supports or can used as part of a mechanical joint assembly.

Thus, regardless of the circumstance, the joint seal 100 may be used as a standalone system or with dissimilar mechanical connections and common metal cover plates as known in the art.

Figure 10:
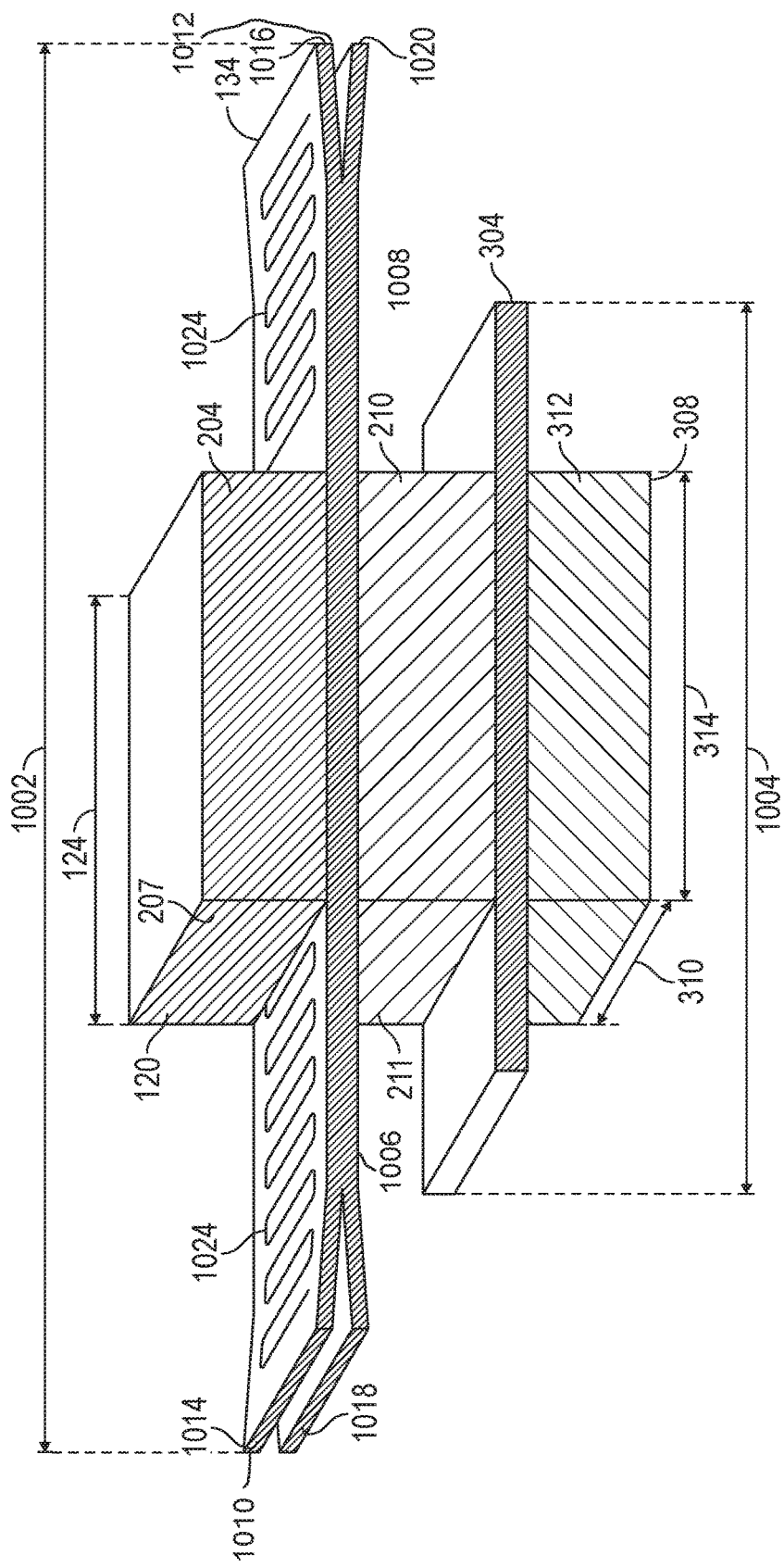
FIG. 10 is an illustration of a side view of one embodiment of the expansion joint seal system of the present disclosure.

Further, where the barrier 134 is electrically conductive, electrical current may be provided to the barrier 134, which by virtue of its resistance will cause the barrier 134 to radiate heat, which may be sufficient to encourage expansion or field curing of the joint seal 100. This internal heating may be beneficial during installation of a joint seal 100 during cold temperatures, might cause the rate of expansion of the joint seal 100 to be slowed. Such internal heating may further be beneficial to prevent freezing or the accumulation of ice atop the joint seal 100. Internal heating may even be beneficial in warm temperature installations in connection with an impregnation intended to provide a slow release to retain the joint seal 100 in a compressed state until expansion is required. The internal heating provided by an electrically-conductive barrier 134 may further benefit installation of abutting joint seals 100 as radiated heat may further the bonding of joint unions during curing or may be used as a heat accelerating or inducing means for a joint sealant adhesive. Further, an electrically-conductive barrier 134 may be identification of moisture (water) penetration through the first body of compressible foam 120, as such moisture would alter the characteristics of the barrier 134, particularly conductance (G measured in siemens or mhos), resistance (R in ohms) or loss of energy to ground of the joint seal 100 between sections. Alternative, as illustrated in FIG. 10, an electrically-conductive thread or mat 1024 may be applied to the barrier 134. Similar function could be obtained by the addition a carbonaceous powder, carbon graphite, copper or other conductive powder or filler to the first body of compressible foam 120 or impregnation compound associated with the first body of compressible foam 120. Conductive fillers have the benefit of yielding variable resistance in the joint seal 100 based on the compression ratio of the foam allowing the potential for feedback, whether immediate or of limited delay, about the expansion joint dynamics in critical applications.

By laminating in a coplanar orientation, the foam of the first body 120 or the second body 128 is not separated by the normal cyclical movement of the joint occurs with parallel laminations under compression and extension cycling.

In the first embodiments of the joint seal 100, these various dimensions are generally equivalent, i.e. substantially the same. The first body length 202, the barrier length 214 and the second body length 208 are generally equivalent, i.e. substantially the same, for provide a common length. Similarly, the first body width 124 and the second body width 132 are generally equivalent, i.e. substantially the same, for provide a common width. The barrier width 136 may be equivalent, i.e. substantially the same, to the first body width 124 and the second body width 132.

To form the integral whole, the barrier 134 is adhered to the first body of compressible foam 120 at the first body bottom 122, the barrier 134 is adhered to the second body of compressible foam 128 at the second body top 126. This may be accomplished by use of a conventional adhesive. The group of the first body first end 204, the second body first end 210, and the barrier first end 216 are co-planar, and the group of the first body first side 206, the second body first side 212, and the barrier first side 218 may be also co-planar.

When installed, the joint seal 100 provides advantages over the prior art. When installed, the joint seal 100 is compressed between the first substrate 102 and the second substrate 104, such that each side of the joint seal 100 is in contact with an exposed side 112, 116 of the first substrate 102 and the second substrate 104. While the joint seal 100 may be maintained in place with adhesive on its sides, some water resistance is provided as a result of the joint seal 100 remaining in some compression after installation. The joint seal 100 is selected for use where at least the first body width 124 is greater, absent any lateral forces on the joint seal 100, than the distance or gap 105 between the exposed side 112 of the first substrate 102 and the exposed side 116 of the second substrate 104. The joint seal 100 is laterally compressed and in positioned in the gap between the first substrate 102 and the second substrate, and preferably below, or equivalent, i.e. substantially the same, with, one or both of the top surface 101 of the first substrate 102, a distance 110 above the bottom of the gap 105, and the top surface 103 of the second substrate 104, a distance 114 above the bottom of the gap 105. As the first body width 124 is greater than the distance or gap 105 between the exposed side 112 of the first substrate 102 and the exposed side 116 of the second substrate 104, the joint seal 100 remains in compression. The lateral forces attempting to return to the joint seal 100 to the uncompressed, original state, cause the joint seal 100 to remain in place and for any adhesive to remain in full contact with the sides 112, 116 of the substrates 102, 104.

When exposed to fire, the first body of compressible foam 120 may be partially, or entirely, consumed by fire, but the barrier 134 prevents the fire from consuming the second body of compressible foam 128, such that when fire suppression equipment is used, the first body of compressible foam 120 may be blown out of the joint, but the remaining second body of compressible foam 128 and barrier 134 prevent water or other materials from entering the joint between the panels, which could otherwise require removal of the panels.

Thus, the joint seal 100, as a seal for imposition under compression into to a joint, may have a first body of compressible foam 120, a second body of compressible foam 128, and a resilient flexible barrier 134. The first body of compressible foam thus has a first body bottom 122, a first body thickness 123, a first body first side 206, a first body second side 207. The second body 128 thus has a second body top 126, a second body first side 212, and a second body second side 211. The resilient flexible barrier 134 thus has a resilient flexible barrier first wing 1006 extending beyond the first body first side 206 and the second body first side 212, which may be a distance greater than the first body thickness 123. The resilient flexible barrier 134 further thus has a resilient flexible barrier second wing 1008 extending beyond the first body second side 207 and the second body second side 211 a distance greater than the first body thickness 123. The resilient flexible barrier 134 further thus has the resilient flexible barrier 134 adhered to the first body of compressible foam 120 at the first body bottom 122 from the first body first side 206 to the first body second side 207, and the resilient flexible barrier 134 adhered to the second body of compressible foam 128 at the second body top 126 from the second body first side 212 to the second body second side 211.

Figure 9:
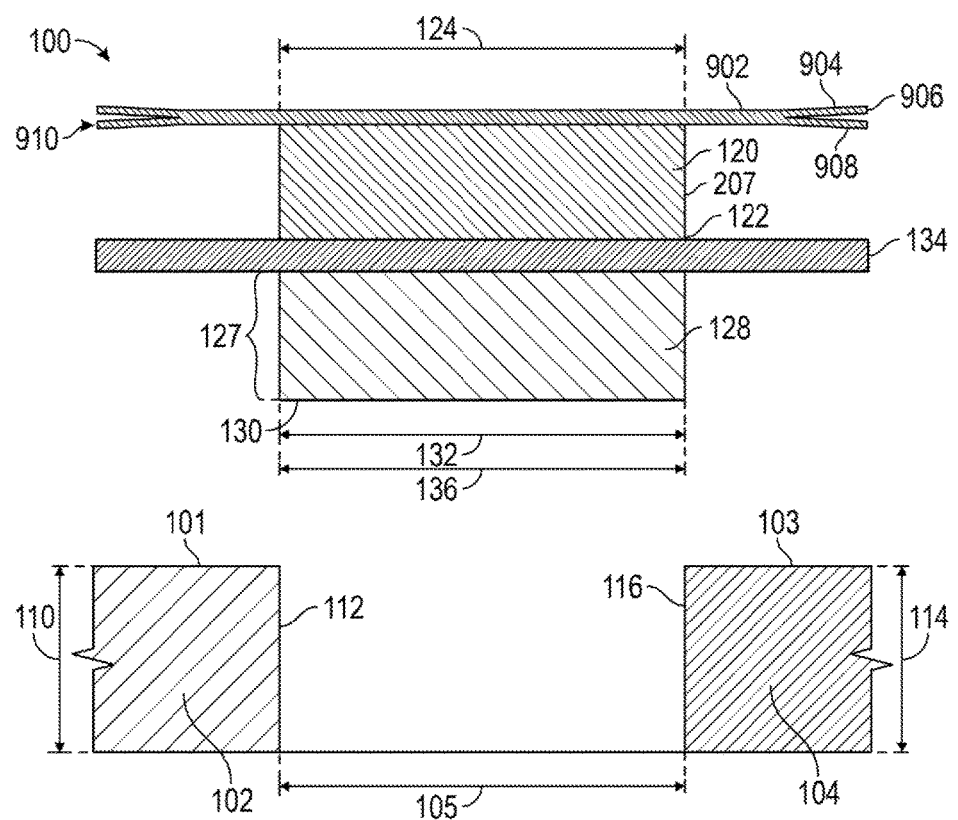
FIG. 9 is an illustration of an alternative expansion joint seal system of the present disclosure.

Referring to FIG. 1, the, joint seal 100 may further include an elastomer 138, such as silicone, adhered to the first body top 118 and/or to the bottom of the bottom-most layer or body 128, the second body bottom 130 in the first embodiment. Alternatively, as illustrated in FIG. 9 the joint seal 100 may alternatively include a resilient flexible surface barrier 902, such as one or more layers of a synthetic rubber roofing membrane, including ethylene propylene diene terpolymer (EPDM), bonded or adhered to the first body top 118, such as by heating of materials or by adhesive. The surface barrier 902 may include at its distant end 904 an upper elongate appendage 906 and, below and generally coplanar, a lower elongate appendage 908, formed, for example, by the lack of adhesive between two adjacent layers or bodies and by cutting a single layer or body along its edge 910. The surface barrier 902 may lap over or about the membrane of a roofing system to provide an effective seal. The surface barrier 902 may be heated or adhesively bonded to the roofing system, or may be affixed with fasteners or anchoring strips to the roofing system. The surface barrier 902 may include a layer from at least one of a heat barrier, an infrared barrier, a high tensile barrier, a water barrier, air barrier and a vapor barrier. The embodiment depicted in FIG. 9 may therefore provide substantial benefits, including insulation, sound dampening, water resistance, fire resistance, accommodation of roof expansion and may provide a redundant seal to the internal pre-compressed foam. The surface barrier 902 thus provides a continuous barrier which may be used as a roof joint sealant, which ties into the building to provide waterproofing, and may be used to join to vertical joint systems. The resulting continuity of barrier provided may be particularly beneficial in below grade applications and applications where a hydrostatic head may be present.

Figure 3:
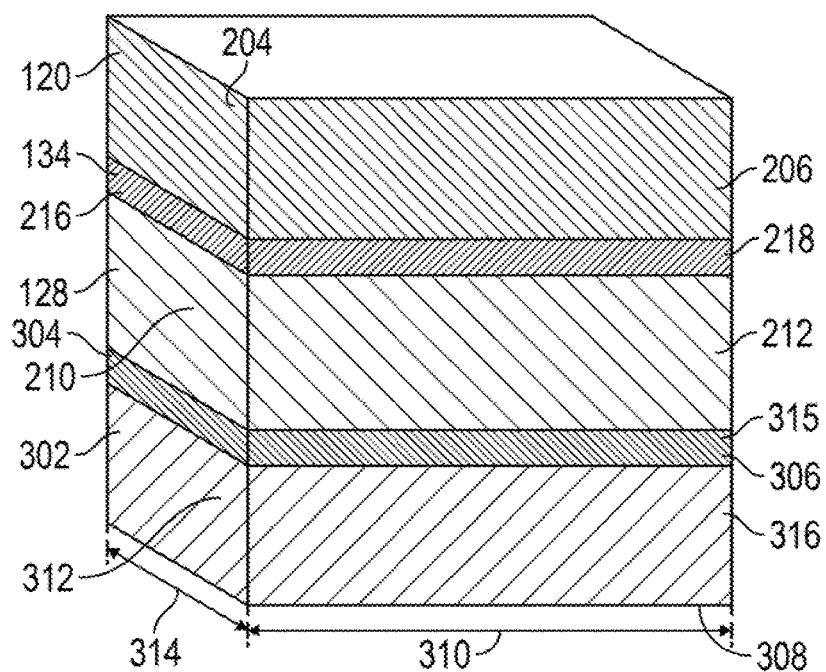
FIG. 3 is an illustration of a view of an alternative expansion joint seal system of the present disclosure.

Referring now to FIG. 3, in another embodiment, the joint seal 100 may further include a third body of compressible foam 302 and a resilient flexible second barrier 304. In this embodiment, the third body of compressible foam 302 includes a third body top 306, a third body bottom 308, a third body length 310, a third body first end 312, a third body width 314, and a third body first side 316. The first body length 202 and the third body length 310 are equivalent, i.e. substantially the same, and the first body width 124 and the third body width 314 are equivalent, i.e. substantially the same. In this embodiment, the second barrier 304 is adhered to the second body of compressible foam 128 at the second body bottom 130 and is adhered to the third body of compressible foam 302 at the third body top 306. The second barrier 304 would include a layer of a heat barrier, an infrared barrier, a high tensile barrier, a water barrier, air barrier and/or a vapor barrier, which need not be identical to the barrier 134. The first body first end 204 and the second barrier first end 315 are co-planar, and the first body first side 206 and the second barrier first side 318 may be co-planar.

The relative thickness of the third body of compressible foam 302 and of the second barrier 304 is likewise dependent on the compositions selected for each layer, the overall thickness of the joint seal 100, and the operating width of the joint seal 100. In the preferred embodiment, the thickness of the third body of compressible foam 302 does not vary by more than twenty-five percent (25%) from the other bodies, and the second barrier 304 is less than twenty-five percent (10%) of the thickness of the thinnest body 120, 128, 302. This embodiment can therefore provide redundant sealing above and below a tie membrane, joint connection or building component. This double layer or body embodiment may be used along the length of one or both substrates and one or both ends of a joint section.

The barrier 134 and the second barrier 304 need not be a solid when adhered to the respective bodies of compressible foam, but may be a liquid or powder, including or separate from, the adhesive. Moreover, the embodiment of FIG. 3 may be constructed with the equivalently-sized profile, i.e. substantially the same, cut for the first body of compressible foam 120, the barrier 134, the second barrier 304, the second body of compressible foam 128, and the third body of compressible foam 302, while the second barrier 304 may utilize the wing 602 and sinusoidal shape depicted in FIG. 6. As a result, a barrier which is between 0.1875 and 0.325 inches wide but the same height allows for a barrier thickness of up to 0.06 inches (60 mils). Where a barrier, whether the barrier 134 or a second barrier 304, is formed of rigid copper, particularly a rigid copper barrier formed in a sinusoidal shape, it is advantageous for each body of compressible foam 120, 128 abutting the barrier to formed to the same sinusoidal shape so that the components mesh together. Thus, the second barrier 304 may be set in nosing or concrete, or supplied with an adhesive on the ends or underside of the second barrier 304 to facilitate the installation of the joint seal 100 in deep joint substrates.

The joint seal 100 is constructed by providing a first body of compressible foam 120, providing a second body of compressible foam 128, providing a barrier 134, adhering the barrier 134 to the first body of compressible foam 120 at the first body bottom 122, and cutting the first body of compressible foam 120, the second body of compressible foam 128, and the barrier 134 to provide a common first end, a common second end, a common first side and a common second side.

The method of construction may further include providing a third body of compressible foam 302, providing a second barrier 304, adhering the second barrier 304 to the second body of compressible foam 128 and to the third body of compressible foam 302, and cutting the third body of compressible foam 302 and second barrier 304 at the common first end, at the common second end, at the common first slide and at the common second side.

Once these components are joined into an integral unit, the joint seal 100 may be cut to length and compressed and imposed between the first substrate 102 and the second substrate 104. The integral unit provides advantages after the prior art. Because the components are joined into the joint seal 100 prior to installation, the dimensions of the components are equal, providing a full edge on each surface, avoiding the potential of exposed surfaces and permitting better joining at the butt of each joint seal 100. Moreover, because the components are joined prior to installation in the gap, a complete adhesion between each component and the adjacent component is obtained, rather than the potential for air gaps between components and avoiding the potential for any offset in the actual gap, which could frustrate performance. Additionally, because the components are made integral before installation in the gap, the barrier is assured to be in the correct position, such that destruction of the top body of compressible foam is destroyed or rendered inoperable, the barrier maintains its function.

Additionally, the first body of compressible foam 120, the second body of compressible foam 128, and where present, the third body of compressible foam 302 may be provided with different compression ratios. Different compression ratios would facilitate the installation process and allow for compression ratios to be used that were previously unachievable in a single compression ratio system, such as where the first body of compressible foam 120 may have a lower compression ratio, while other bodies of compressible foam may have higher compression ratios, resulting in a joint seal 100 which is more watertight at the bottom, while more flexible on the top. As can be appreciated, this structure may be reversed for different properties.

Referring now to FIG. 10, the barrier 134 of the embodiment of FIG. 3 may be provided with a barrier width 1002 which is greater than the first body width 124 and the second body width 132 to provide a first wing 1006 and a second wing 1008. The second barrier 304 may have a second barrier width 1004, greater than each of the second body width 132 and the third body width 314. Each wing 1006, 1008 may include at its distant end 1010, 1012 an upper elongate appendage 1014, 1016 and, essentially generally in a parallel plane to and below, a lower elongate appendage 1018, 1020, formed, for example, by the lack of adhesive between two adjacent layers or bodies and by cutting a single layer along an edge 1022. Such appendages may lap over or about a roofing system to provide an effective seal.

Figure 4:
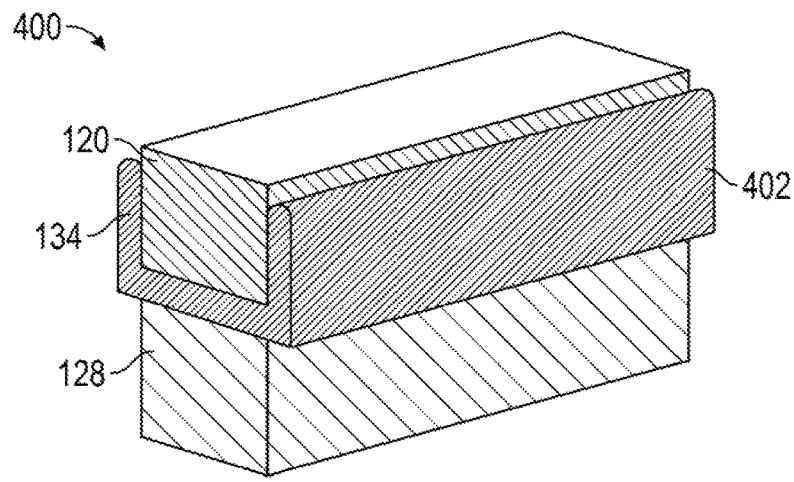
FIG. 4 is an illustration of a further alternative expansion joint seal system of the present disclosure.

Referring now to FIG. 4, in an alternative embodiment 400, the joint seal includes a first body of compressible foam 120, a second body of compressible foam 128, and a barrier 134 adhered to both the first body of compressible foam 120 and the second body of compressible foam 128, wherein the compressible bodies have equivalent, i.e. substantially the same, lengths and widths but the barrier extends beyond the edge of the first body of compressible foam 120 on at least one side to provide a wing 402 can be turned up (or down) and adhered, at installation, to the substrate 102, 104. Additionally, a slow drying adhesive may be applied to the wing 402 or to the second barrier 304 before insertion. Traditional, faster drying adhesive, such as epoxy, are to be avoided as they can cure before insertion. Application of an adhesive to the wing 402 may provide a greater depth of seal and bonding area.

Figure 8:
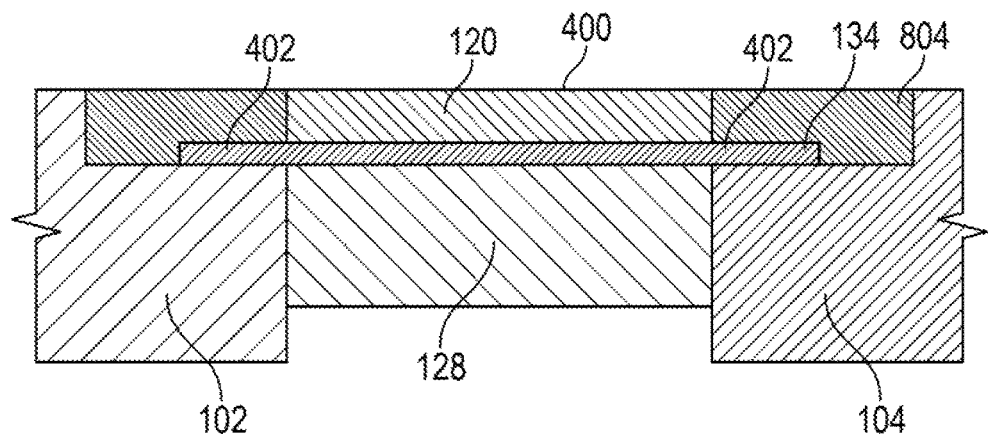
FIG. 8 is an illustration of the further alternative expansion joint seal as installed into a substrate.

This embodiment allows the barrier 134 to extend past the compressible body laminations and be used as wing 402 to be set into the concrete substrate 102, as illustrated in FIG. 8. This is helpful for split face concrete or application where it is desirable to extend the properties of the barrier 134 past the edge of the joint substrate 102, 104. The wing 402 provides a continuous bar against air penetration between sections and with a joint substrate or other building material.

Figure 11:
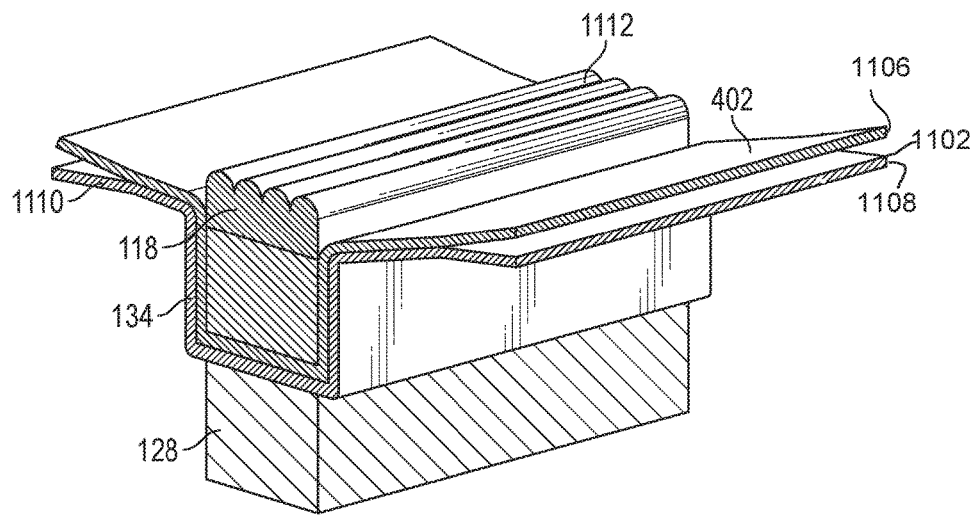
FIG. 11 is an illustration of a further alternative expansion joint seal system of the present disclosure.

Further, as illustrated in FIG. 11, the wing 402 may include at its distant end 1102 an upper elongate appendage 1106 and essentially co-planar and below, a lower elongate appendage 1108, formed, for example, by the lack of adhesive between two adjacent layers or bodies and by cutting a single layer along its edge 1110. Such elongate appendages may lap over or about a roofing system to provide an effective seal. Further, an elastomeric layer 1112 may be applied to the first body top 118 and bonded to facilitate a compression profile on the first body of compressible foam 120. The barrier 134 may be composed or one or more layers of a synthetic rubber roofing membrane, including ethylene propylene diene terpolymer (EPDM).

Figure 5:
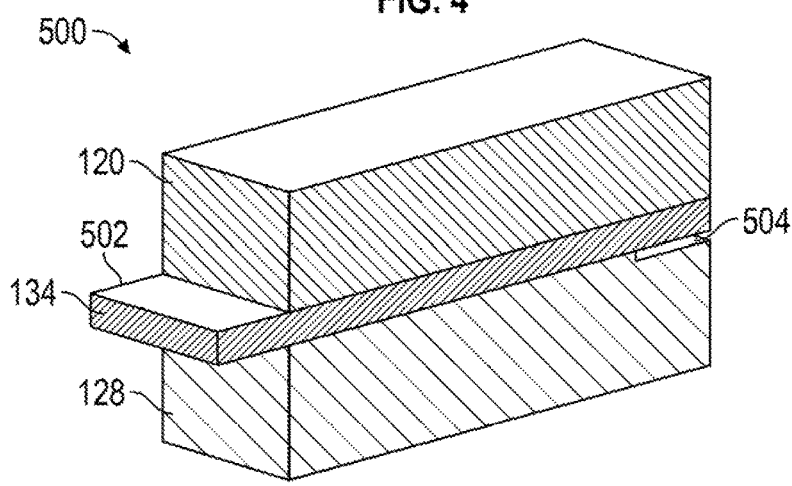
FIG. 5 is an illustration of a further alternative expansion joint seal system of the present disclosure.

Referring now to FIG. 5, a further alternative embodiment 500 of the joint seal 100 is illustrated. In the further alternative embodiment 500, the barrier 134 protrudes beyond an end of the joint seal 100, beyond the first body first end 204, providing a tab 502. The barrier 134 may have a resilient flexible barrier length 214 equivalent, i.e. substantially the same, to the first body length 202. The barrier 134 may not be adhered to either the first body of compressible foam 120 or to the second body of compressible foam 128 and an opposing end, or potentially at both ends of the joint seal 100, providing a separable gap 504. As a result, the tab 502 of one unit of the joint seal 100 may be inserted into the end of an adjacent joint seal 100 in the separable gap 504. The length of the tab 502 and the distance of separable gap 504 may be as much, or even more than, two inches. For example, a sixty (60) inch length of joint seal 500 may include a three (3) inch tab 502 and a matching length gap 504 where the lamination of the first body 120, the barrier 134, and the second body 128 are bonded together, so that unbonded tab 502 may be inserted and joined, such as with an adhesive on one or both of its top and bottom, to provide a continuous and overlapping joint system. An adhesive seal may be used on each tab 502 or in each separable gap 504 to tie adjacent joint seals 100 together so as to provide a continuous barrier along the length of the joint. This resolves a weakness, which may be substantial, of joint unions in joint construction and common cause of failure, which is usually accomplished only by bonding the butt ends of the joint seals 100 together. Continuous connections of the barrier 134 at joints provide an advantage over current splices, whether factory or field, which often are merely adhesive or intumescent splices.

Figure 12:
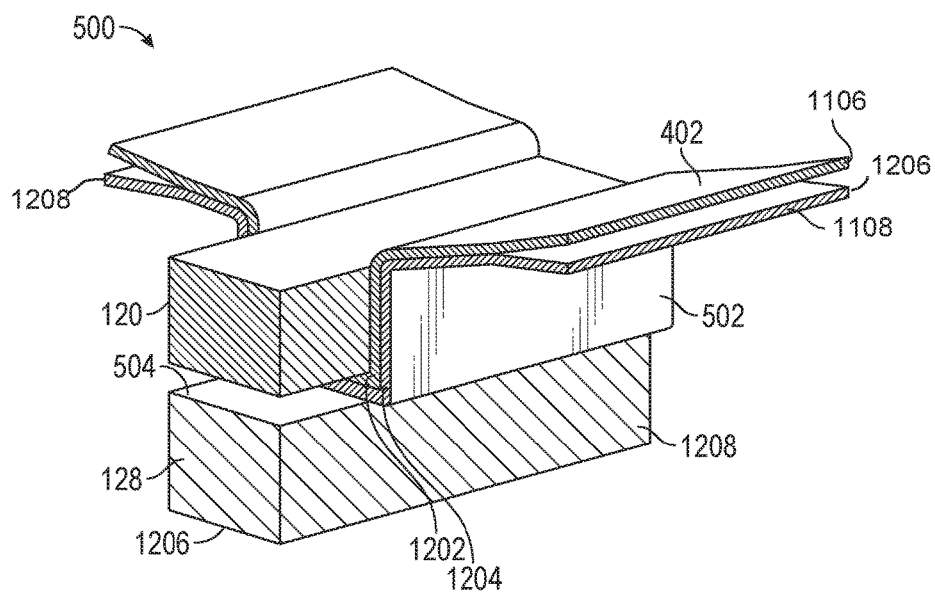
FIG. 12 is an illustration of a further alternative expansion, joint seal system of the present disclosure.

Referring to FIG. 12, the further alternative embodiment 500 of the joint seal 100 may incorporate the wing 402, with an upper elongate appendage 1106 and essentially generally in a parallel plane to and below, a lower elongate appendage 1108 at its distant end 1102 of the embodiment of FIG.11 with the barrier 138 of FIG. 5. The barrier 138 may therefore be composed of two adjacent layers or bodies 1202 and 1204, which, while of uniform length are unaligned at the ends 1206, 1208, resulting in the tab 502 and the distance of separable gap 504.

Figure 6:
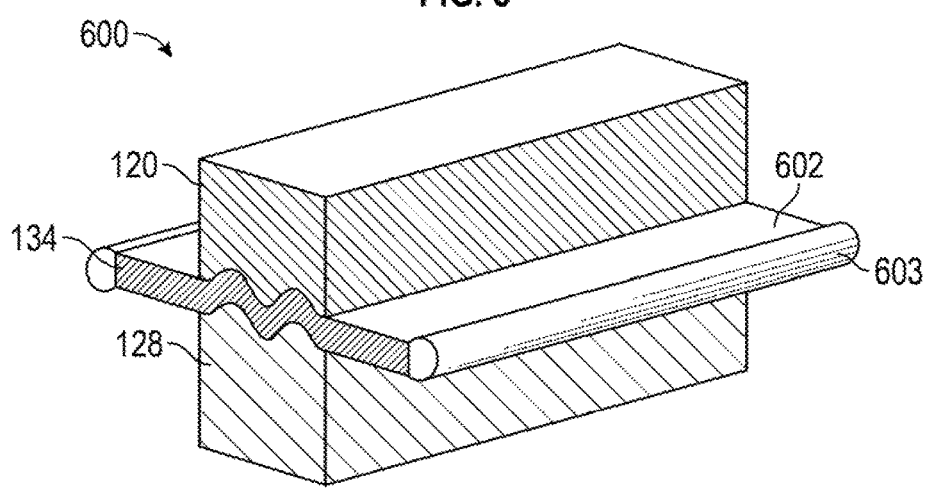
FIG. 6 is an illustration of a further alternative expansion joint seal system of the present disclosure.

Referring now to FIG. 6, in another further alternative embodiment of the joint seal 600, the barrier 134, which could be installed with a sinusoidal structure to encourage deformation and rebounding, could extend outside the edges of the first body 120 and the second body 128 to provide a wing 602 to use an anchoring device and/or a continuation of the beneficial properties of the barrier 134. An example would be using a water and fire resistant foam as the first body 120 with a thick durable reinforced rubber or other similar water barrier 134 with a less-water resistant but more fire-resistant foam as the second body 128. The rubber barrier 134 would be too thick to compress such that it would work well as a moving joint seal but by using the integral sinusoidal pattern for the barrier 134, the first body 120 and the second body 128 can compress and work as a joint sealant. The rubber barrier 134 would extend past the edge of the first body 120 and the second body 128 such that it could be set into a polymer nosing or concrete or act as part of a split slab barrier. This reduces the likelihood that water can move past the joint sealant 100 even if the top seal generated by the first body 120 fails or the concrete spalls at the edge of the joint. This is additionally helpful because the second body 128 can be selected for higher fire resistance and with lower waterproofing requirements. The wing 602 may include at its edge an anchor 603 of increased thickness.

Figure 13:
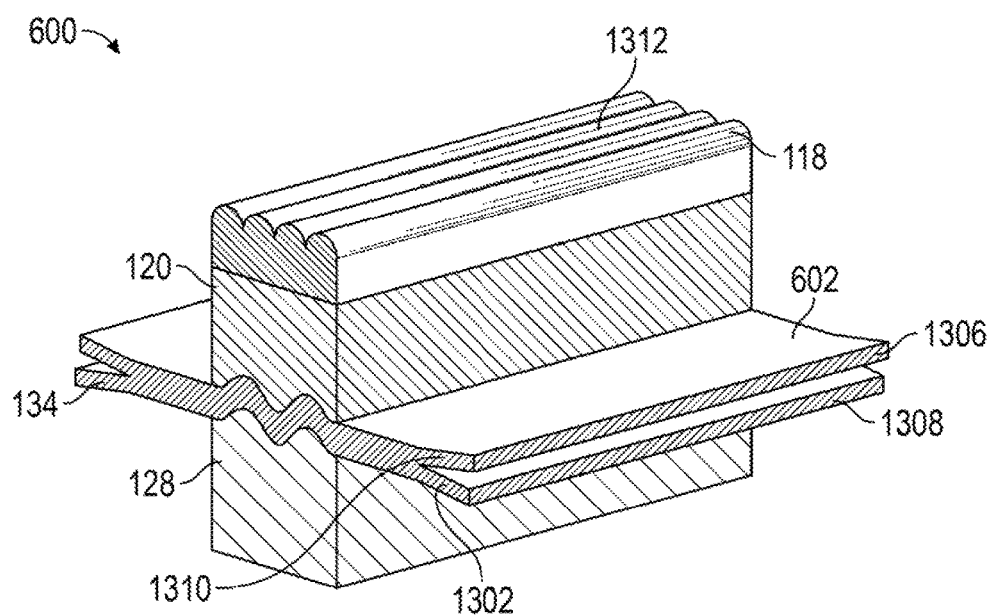
FIG. 13 is an illustration of a further alternative expansion joint seal system of the present disclosure.

Referring now to FIG. 13, the wing 602 may include at its distant end 1302 an upper elongate appendage 1306 and essentially generally in a parallel plane to and below, a lower elongate appendage 1308, formed, for example, by the lack of adhesive between two adjacent layers or bodies and by cutting a single layer along its edge 1310. Such appendages 1306, 1308 may lap over or about a roofing system to provide an effective seal. Further, an elastomeric layer 1312 may be applied to the first body top 118. The elastomer layer 1312 may terminate at the first body first side 206 and the first body second side 207, may extend slightly past the first body first side 206 and the first body second side 207 to provide an overlap of the top edge or the adjacent substrate, or may continue along at the first body first side 206 and the first body second side 207 to provide a silicone-to-silicone bonding surface with the substrate, which may provide a positive seal in circumstances when the substrate is rough or uneven. The barrier 134 may be composed or one or more layers of a synthetic rubber roofing membrane, including ethylene propylene diene terpolymer (EPDM), bonded to the first body top 118.

Figure 7:
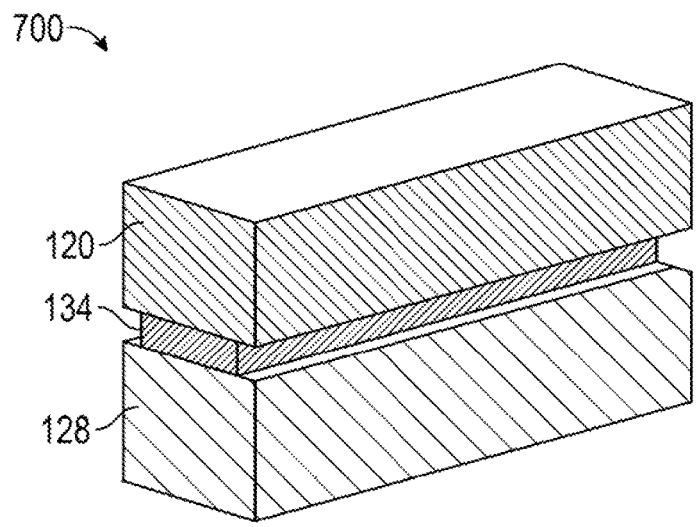
FIG. 7 is an illustration of a further alternative expansion joint seal system of the present disclosure.

Referring now to FIG. 7, in another further alternative embodiment 700, the barrier 134 may be of a narrower width than the first body 120 and the second body 128. Thus, the barrier 134 may terminate short of the edge of the first body 120 and the second body 128. This variation allows for the benefit of the different foams for the first body 120 and the second body 128 and also allows for the barrier 134 to accept less compression while still providing its intended properties.

In connection with each embodiment, cutting the first body 120 and the second body 128 into interlocking (male/female) sections using a radius of at least 0.1875 inches permits a thicker barrier 134 to be used without bowing or deformation of the foam, a benefit previously available only when a thin barrier 134 might be used. In the prior art, use of a random accordion style would cause the barrier 134 to fatigue after cycling.

An example is a joint seal using two different fire-rated foams as the first body 120 and the second body 128 adhesively bonded together with a barrier 134 of copper foil to block EMF radiation. A barrier 134 of copper would not be as flexible as the foam of the first body 120 and the second body 128 and would benefit from the sides of the first body 120 and the second body 128 compressing before the barrier 134 of copper would need to compress or flex. The resultant joint sealant 700 would serve to provide a fire-resistant material required in sound booths, studios, and concert halls, and offer the benefit of the barrier 134 of copper serving as flexible (compressible) EMF blocking device.

The joint seal 100 may provide an elegant transition in lieu of vertical and horizontal expansion joint, eliminating the need for two trades to install a connection for a vertical expansion joint. The typical arrangement of roofers providing roof joints and roofing while waterproofers provide the expansion joints is therefore eliminated. It is well known in the art that joints tend to leak or fail at changes in direction or plane and where dissimilar joint types or materials are intended to join. The joint seal 100 of the present disclosure addresses this shortcoming by simplifying the connection between the two planes—by using the same material for the roof expansion joint and the vertical wall expansion joint. Multiple joint seals 100 can be adhesively, or mechanically and adhesively, connected as they are made of similar materials and have similar thermal and expansion properties. The joint seal 100 may span the transition points, anywhere from an angle greater than zero to an angle less than 180 degrees.

Figure 14A:
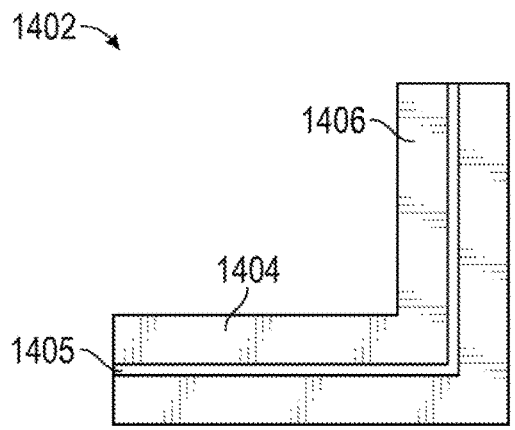
FIG. 14A is an illustration of the present disclosure when used in the transition from a horizontal to vertical joint wherein the first body of compressible foam and the second body of compressible foam include a right angle turn.
Figure 14B:
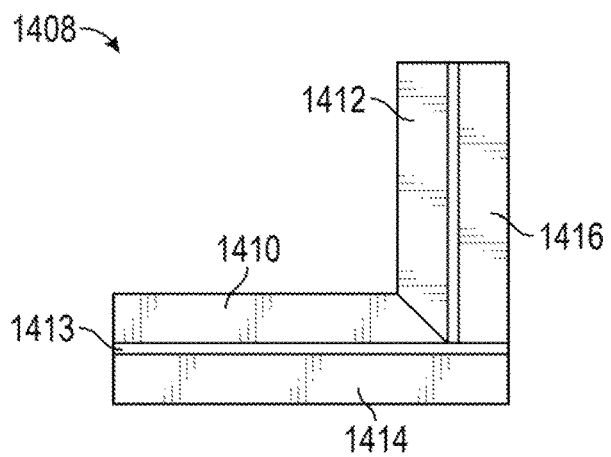
FIG. 14B is an illustration of the present disclosure when used in the transition from a horizontal to vertical joint wherein a section of one of the first body of compressible foam and the second body of compressible foam is joined or attached to another section in right angle abutment and the associated one of the second body of compressible foam and the first body of compressible foam is joined or attached to the other section in a mitered cut.
Figure 14C:
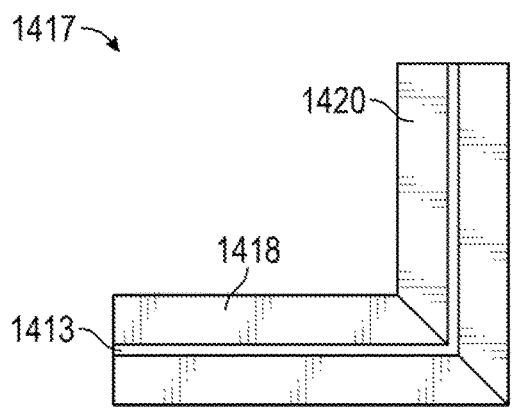
FIG. 14C is an illustration of the present disclosure when used in the transition from a horizontal to vertical joint wherein the first body of compressible foam and the second body of compressible foam of one section is joined or attached to another section in a mitered cut.
Figure 14D:
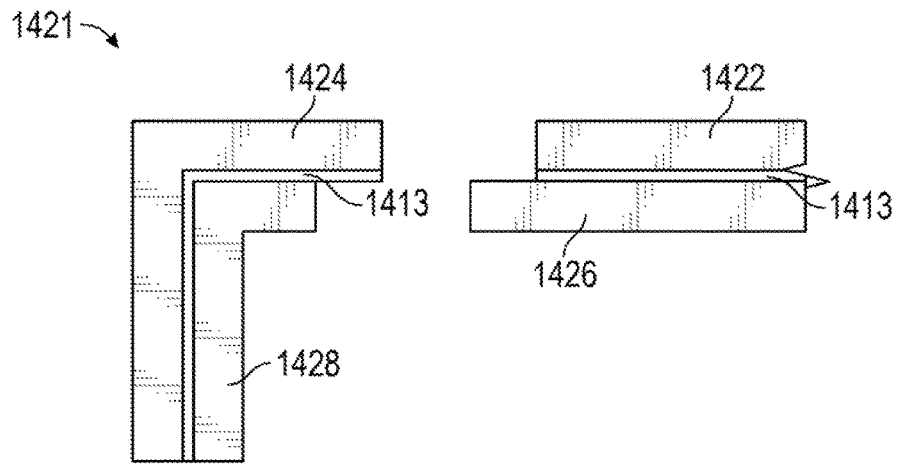
FIG. 14D is an illustration of the present disclosure when used in the transition from a horizontal to vertical joint wherein a section of one of the first body of compressible foam and the second body of compressible foam is joined or attached to another section in right angle abutment and the associated one of the second body of compressible foam and the first body of compressible foam is joined or attached to the other section in a offset right angle abutment, such that the ends of the first body of compressible foam and the second body of compressible foam are not co-terminus.
Figure 14E:
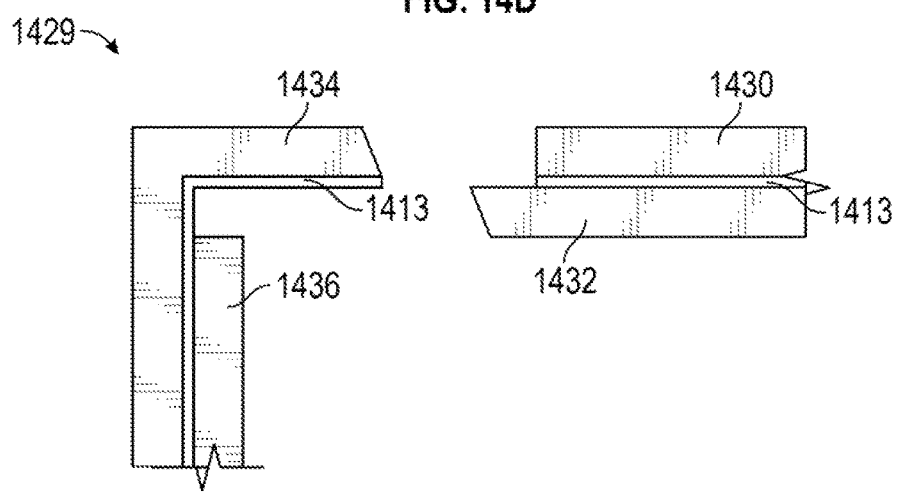
FIG. 14E is an illustration of the present disclosure when used in the transition from a horizontal to vertical joint wherein a section of one of the first body of compressible foam and the second body of compressible foam, which includes a right angle extension occurring beyond the first end of one body and terminating in a mitered cut, is joined or attached to another section in right angle abutment, but wherein the one of the first body of compressible foam and the second body of compressible foam terminates in a mitered cut.
Figure 14F:
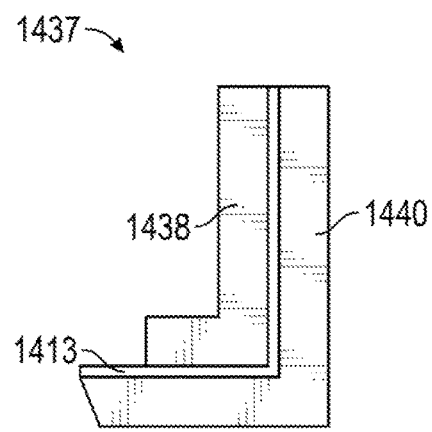
FIG. 14F is an illustration of the present disclosure when used in the transition from a horizontal to vertical joint wherein one of the first body of compressible foam and the second body of compressible foam terminates in a mitered cut.

Referring to FIGS. 14A, 14B, 14C 14D, 14E and 14F, the joint seal 100 provides the advantageous characteristic of being usable for both horizontal joints and vertical joints by use of a transition. These transitions may be formed of a single foam section of each layer, or by the use of multiple sections. Referring to FIG. 14A, a factory transition 1402 from a horizontal to vertical joint may be provided such that the first body of compressible foam 120 and the second body of compressible foam 128 are each formed to include a right angle turn, such that the two layers 1404, 1406 are adjacent throughout the transition, separated by a continuous barrier 1405. Referring to FIG. 14B, a transition 1408 provides a section 1410 of one of the first body of compressible foam and the second body of compressible foam joined or attached to another section 1412 in right angle abutment and the associated section 1414 of the second body of compressible foam and the first body of compressible foam is joined or attached to the other section 1416 in a mitered cut. In this embodiment, and in those of FIGS. 14B-14F, the barrier 1413 may be continuous, may be two abutting sections, or may be overlapping sections. Alternatively, the abutment type may be reversed between the first body of compressible foam 120 and the second body of compressible foam 128 or one pair of abutted or joined sections may be replaced with a continuous, right-angle body illustrated in FIG. 14A. In a further alternative, both the first body of compressible foam 120 and the second body of compressible foam 128 may be joined with a miter cut. Referring to FIG. 14C, the transition 1417 from a horizontal to vertical joint is illustrated wherein the first body of compressible foam 120 and the second body of compressible foam 128 of one section 1418 is joined or attached to another section 1420 in a mitered cut. Alternatively, the first body of compressible foam 120 and the second body of compressible foam 128 may be terminated to provide an offset to prevent separation in a field perpendicular to the runs of the bodies. Referring to FIG. 14D, a transition 1421 from a horizontal to vertical joint is illustrated wherein a section 1422 of one of the first body of compressible foam 120 and the second body of compressible foam 128 is joined or attached to another section 1424 in right angle abutment and the associated section 1426 of the second body of compressible foam 128 and the first body of compressible foam 120 is joined or attached to the other section 1428 in a offset right angle abutment, such that the ends of the first body of compressible foam 120 and the second body of compressible foam 128 are not co terminus. Similarly, when an offset ending is used for the joint seal 100, the transition may be constructed to be immediately adjacent the end, and the abutting end of a first body of compressible foam 120 and the second body of compressible foam 128 may be provided with a mitered or tapered cut ending, promoting different rates of compression within the transition when constructed. Referring to FIG. 14E, such a transition 1429 is illustrated wherein a section 1434 of one of the first body of compressible foam 120 and the second body of compressible foam 128, which includes a right angle extension occurring beyond the first end of one body and terminating in a mitered cut, is joined or attached to another section 1430 in right angle abutment, but wherein the one of the first body of compressible foam 120 and the second body of compressible foam 128 terminates in a mitered cut. Further, the transitions illustrated in FIGS. 14A, 14B, 14C and 14D may likewise include one of the first body of compressible foam 120 and the second body of compressible foam 128 terminating beyond the other in a mitered cut. Referring to FIG. 14F, a transition 1437 is illustrated wherein at least one of the first body of compressible foam 120 and the second body of compressible foam 128 terminates in a mitered cut, providing sections 1438 and 1440. Further, the bond between the first body of compressible foam, the barrier and/or the second body of compressible foam may be temporary, allowing a more independent operation alter installation.

The transition may further include a barrier 134 and provide the tab 502 and the associated offset for interlacing barriers and tie-in function to the substrate or other building material.

Figure 15:
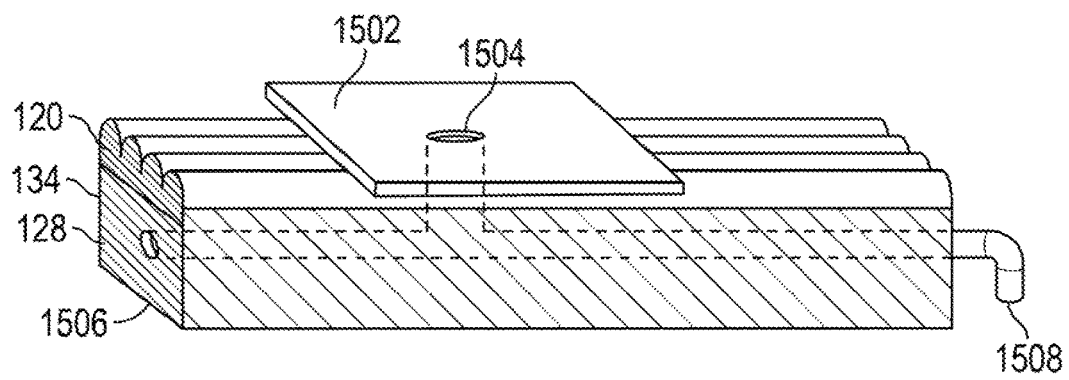
FIG. 15 is an illustration of an alternative embodiment of the present disclosure.

Referring to FIG. 15, the joint seal 100 may further be integrated with other accessories known in the art. For example, a walking pad 1502 may be affixed to the first body top 118, or to the elastomeric layer 1312 or to the barrier 134, particularly for roof areas requiring foot or other traffic access. The elastomeric layer 1312 or to the barrier 134 can further include a layer of a fire barrier coating such as FireOut™ Fire Barrier Coating by GAF, applied above or below the roof joint. Alternatively, such a walking pad 1502 could be unbonded on extended walking areas, functioning essentially as a protective cover plate, over the joint seal 100. The walking pad 1502, cover plate or aesthetic expansion joint cover need not be of the same materials as the joint seal 100 as they do not perform a sealing function but rather another additional function such as, but not limited to slip resistance. The joint seal 100 may further include a drain 1504 through the first body of compressible foam 120, which may extend into the bottom of the second barrier 304 when present, to drain any moisture or water if it ever accumulated inside the joint seal 100. The drain 1504 may be connected to a tube or pipe 1506 to drain or direct the water to an exterior outlet 1508 which may drain to a drainage system, such as guttering, providing an important feature in creating a fail-safe roof joint system. Alternatively, the drain 1504 may communicate with the second body of compressible foam 128, which second body of compressible foam 128 may shed downward the associated water.

Figure 16:
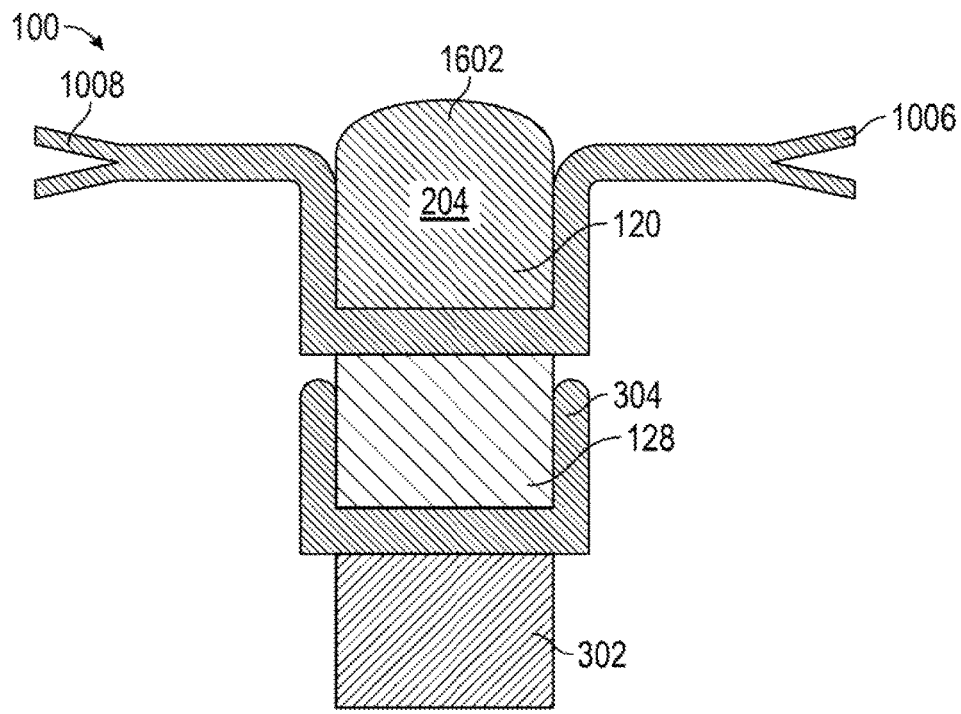
FIG. 16 is an illustration of an alternative embodiment of the present disclosure.

Referring to FIG. 16, the structure of the joint seal 100 may be contoured to deflect water. A crown 1602 or crest may be positioned in the middle of the joint seal 100 such that water does not accumulate on the joint seal 100 but rather runs off the joint seal 100. The wings 1006, 1008 may further be used as a flashing to divert the water away from the expansion joint. The crown 1602, which may be concave, convex or have a shaped profile, may extend from the end of the joint seal 100 such that it extends from the first body first side 206 side of first body of compressible foam 120 to its second side 206, providing a continuous layer providing functional benefit, such as, but not limited to, water resistance. Thus, the second barrier 304 can provide a unified roofing system while the barrier 134 can serve as a flashing or water diversion membrane. In this instance the barrier 134 may be much thicker or longer than the second barrier 304 or it may be the same dimensions. Each of the bodies of compressible foam may include this crown structure, provided the adjacent surface of the adjacent body has a similar crown structure, such that the bodies nest about the curves membrane. Similarly, the material can be supplied in a concave or valley design to act as a trough or a drain to divert water along the expansion joint to a roof drain (even one internal to the roof joint) or other exit point. The trough or valley can be tapered to the drainage point by gradually recessing the expansion joint assembly or by reducing the amount of foam about the barrier 134 or by reducing the thickness 123 of the first body 120 such that it allows the water to flow in the intended direction. It is anticipated that other functional systems may be integrated into the expansion joint or the functional membrane such as a vent, conduit connection or other connection or function for energy efficiency systems such as solar panels. A unified, continuous multi-functional joint seal is thus provided across multiple planes without the need for further components, such as mechanical transitions or covers.

Figure 17:
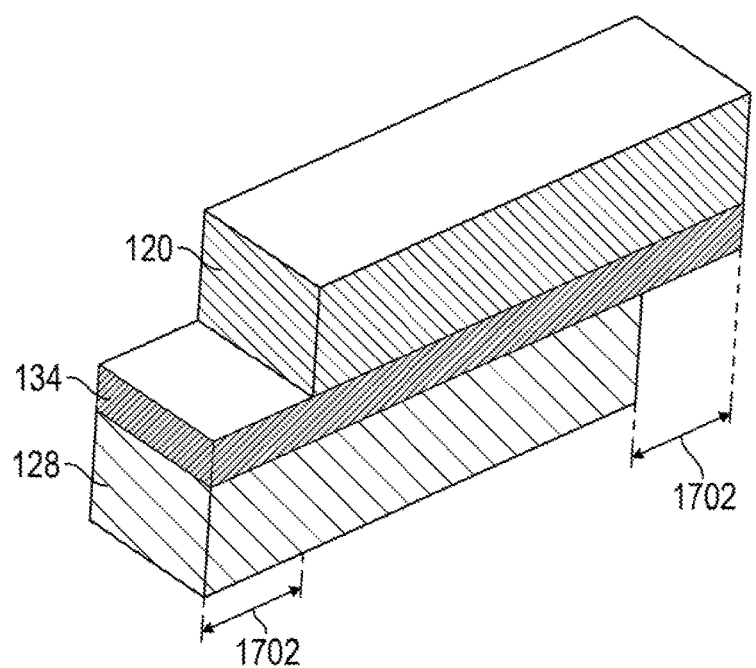
FIG. 17 is an illustration of an alternative embodiment of the present disclosure.

Referring to FIG. 17, the joint seal 100 may have a first body of compressible foam 120 and a second body of compressible foam 128 which are not co-terminus. The resulting offset 1702 provides an area without a coating to receive an extended functional layer from the joining section. The offset may prove particularly beneficial in areas contemplated to have standing water. Such a structure may be particularly advantageous when field splices are contemplated.

In each embodiment, the composition of the present disclosure, the joint seal 100 reduces the need for additional insulation, as the material supplied can yield an R-value of 3.2R per inch of depth or greater, although additional insulation may be used to reduce the depth of seal foam required or to gain a higher insulation value. Beneficially, the joint seal 100 of the present disclosure may add LEED points to a building due to the improvements in reducing air loss and adding insulation value. This may be particularly important where the joint seal 100 is used in connection with roof joints, as hot air may rise and seek to escape through such joints. Traditional expansion and roof joints may be watertight but are not necessary known to require or be tested for air tightness, especially to meet standards such as the ABAA requirements in the form of an assembly that has an air leakage not to exceed 0.04 cubic feet per minute per square foot under a pressure differential of 1.57 pounds per square foot (0.04 cfm/ft $^2$@1.57 psf) (0.2 liters per square meter per second under a pressure differential of 75 Pa (0.2 L/(s·m$^2$)@75 Pa)) when tested in accordance with ASTM E2357-11. Other moisture and airtightness tests include, without limitation, ASTM E-283, E-330, E-331, E-547, TAS 202/203 and ASTM E2178-11. Historically, most building materials, foam joint sealants and roof joints have not met the requirements of these tests, in particular, when required to transition between dissimilar systems to provide a complete system or assembly. For the highest air barrier standards, E-2357-11 and ASTM E2178-11 only specialized wall covering systems specifically for airtightness have done so and only to the extent that they are a field applied cover or coating other systems.

The use of the method would have other uses obvious to those familiar with the trade to provide a flexible or compressible medium or joint for materials that are fragile or too rigid to allow for movement over an expansion joint. A variation to this method for materials that are thick or would require a higher degree of movement would be to cut the foam in such a pattern to allow for the barrier to bend or flex in a wave-type pattern. For smaller, thinner barriers the foam is typically resilient and compressible enough to allow for the variation in the barrier. For thicker or more rigid barriers it has been found better to cut the foam into a wavy or zig-zag pattern such that the two sections of foam nest into each other (or male-female sections). Thereafter the barrier is adhered to both sections such that when the resulting joint material is compressed the barrier folds with the foam and allows for greater joint movement than if affixed as a thick straight barrier. Another use of this method is to solve the problem of foam joint sealant densities and separating foams with competing properties. Such is the use of one body that is designed to be hydrophobic (some may be slightly to keep out a driving rain other more so for standing water) in its function or not all and the second body is designed to be hydrophilic. In this case the waterproof (and maybe radon proof) harder separates the hydrophilic body that will absorb water or moisture increasing its internal compressive force to stop water penetration but does so in a variable method so some water can penetrate before it has expanded enough to seal the joint. This is undesirable and can lead to mold in confined spaces. The first body 120 can be designed to work as intended and offer a dry exposed surface area. In operation, the first body of the compressible foam 120 or the second body of the compressible foam 128 could be at least partially impregnated with a liquid hydrophobic sealing composition, i.e. in a liquid medium, or with a liquid hydrophilic sealing composition.

Watertight unions can be created by offset cuts, angles etc, or by using the membrane extensions on the ends to join the lengths together by heat seaming/welding, adhesive bonding or a mechanical connection. Factory versions can be made having continuous internal membranes in longer lengths to reduce the number of required splices or unions.

Preferably and unlike the prior art, the present disclosure permits a joint movement of +/−50% movement, i.e. 100% total, of Class I, II, III Movement per ASTM E-1399 while serving in joints up to 12" wide as a self-supporting horizontal system. While ASTM E-1399 is an accepted industry standard however, the total cycles required my not be consistent with real world experience. Beneficially, the barrier 134 reduces the potential for compression set and cycling fatigue of the first body 120 and the second body 128, and therefor of the joint seal 100, as test samples passed 10,000 cycles or more with no sign of failure. This may be greater than 10 years of thermal cycling and 20 times more than required by ASTM 1399-97 (2000). Moreover, the present disclosure may be used for seismic movement, in addition to high movement installations.

Additionally, the joint seal 100 has substantial benefits over the prior art. The joint seal 100 can be used underneath a traditional bellows type roof expansion joint to provide redundancy and further sealing. The first body 120 and the second body 128 do not need to have a fire rating listing, such as with Underwriters Laboratories, but rather can be fire resistant to pass or have results acceptable to provide the intended building code function. Foams sealants are known which pass applicable standards such as UL94, ASTM E-84, ASTM E-119, EN1399, AS1504.3, BS476, DIN 4102-1, DIN 4102-4 F120, DIN 18542, BGI through their intended movement range and tested at the maximum dimension. Beneficially, if the joint seal 100 is used in an area requiring seismic movement requirements, the joint seal 100 meets all of the cycling requirements of UL 2079 and ASTM E-1366 for slow and rapid joint cycling.

The disclosure provides a multi-layer joint system wherein bodies of foam 120, 128, layered co-planar to the adjacent surface, are interspersed with a barrier 134. The foam bodies 120, 128 may be uncompressed or partially compressed at the time of joint seal formation and may be composed of an open cell, closed cell or hybrid foam impregnated or infused with a pressure-sensitive adhesive, which could be acrylic, styrene butadiene rubber (SBR), rubber, wax, asphalt or others apparent to those experienced in the trade, or an unprocessed (fully or partially) open or closed, or hybrid, cell foam. Any of the foam bodies 120, 128 or the barrier 134 may be selected from a self-sealing polymer impregnated design or an internal foam sealant so that, even if compromised, the seal provides a complete seal. A foam body 120, 128 may be impregnated with a fire retardant, if at all, or may be composed of a fire-retardant material, if desired. The barrier 134 may have a tensile strength greater than the adjacent foam bodies 120, 128 (which may be much greater). The joint seal may have an elastomer 138, such as silicone, at its top and/or bottom, and may even include an elastomer layer within the barrier 134.

The foregoing disclosure and description is illustrative and explanatory thereof. Various changes in the details of the illustrated construction may be made within the scope of the appended claims without departing from the spirit of the invention. The present invention should only be limited by the following claims and their legal equivalents.

What is claimed is:
1. A joint seal, comprising,
   a first body of compressible foam, the first body of compressible foam having a first body bottom and a first body width;
   a second body of compressible foam, the second body of compressible foam having a second body top and a second body width;
   a barrier,
      the barrier being flexible,
      the barrier having a barrier width from a first distant end to a second distant end,
         the barrier width greater than each of the first body width and the second body width,
      the barrier contacting a first body first side and not contacting a second body first side,
      the barrier including a first wing extending beyond an edge of the first body of the compressible foam,
         the first wing turned up to adhere to the first body first side,
         the first wing having at a first distant end a first wing upper elongate appendage and a first wing lower elongate appendage,
            the first wing upper elongate appendage not contacting the first body first side
            the first wing lower elongate appendage not contacting the first body first side,
      the barrier contacting a first body second side and not contacting a second body second side,
      the barrier including a second wing extending beyond an edge of the second body of the compressible foam,
         the second wing turned up to adhere to the first body second side,
         the second wing having at a second distant end a second wing upper elongate appendage and a second wing lower elongate appendage,
            the second wing upper elongate appendage not contacting the first body second side,
            the second wing lower elongate appendage not contacting the first body second side,
      the barrier adhered to the first body of compressible foam at the first body bottom,
      the barrier adhered to the second body of compressible foam at the second body top,
      the barrier including a layer from at least one of a heat barrier, an infrared barrier, a water barrier, air barrier and a vapor barrier.
2. The joint seal of claim 1, wherein
   the first body of compressible foam has a first body fire rating and
   the second body of compressible foam has a second body fire rating,
   the first body fire rating and the second body fire rating being unequal.
3. The joint seal of claim 1 further comprising:
   a third body of compressible foam, the third body of compressible foam having a third body top and a third body width;
   a second barrier, the second barrier adhered to the second body of compressible foam at a second body bottom, the second barrier adhered to the third body of compressible foam at the third body top, the second barrier having a second barrier width greater than each of the second body width and the third body width, the second barrier including a layer from at least one of a heat barrier, an infrared barrier, a water barrier, air barrier and a vapor barrier.
4. The joint seal of claim 1 further comprising:
   a first body length, a barrier length, and a second body length being substantially the same.
5. The joint seal of claim 1 further comprising:
   the first body width and the second body width being substantially the same.
6. The joint seal of claim 1 further comprising:
   the first body of compressible foam being impregnated with a fire-retardant composition delivered in a liquid medium.
7. The joint seal of claim 1 further comprising:
   the first body of compressible foam being composed of a fire-retardant material.
8. The joint seal of claim 1 further comprising:
   the second body of compressible foam being impregnated with a fire-retardant composition delivered in a liquid medium.

9. The joint seal of claim 1 further comprising:
the second body of compressible foam being composed of a fire-retardant material.

10. The joint seal of claim 1 further comprising:
a moisture sensitive radio frequency identification device in contact with the first body of compressible foam.

11. The joint seal of claim 1 further comprising:
a heat sensitive radio frequency identification device.

12. The joint seal of claim 1 wherein the barrier is electrically conductive and further comprising:
a radio frequency identification device in electrical connection with the barrier.

13. The joint seal of claim 1 wherein the barrier is heat conductive and further comprising:
a heat sensitive radio frequency identification device in electrical connection with the barrier.

14. The joint seal of claim 1, wherein a first body top of the first body of compressible foam further includes a crown at a middle of the first body top to increase a thickness of the first body of compressible foam.

\* \* \* \* \*